(12) United States Patent
Primlani

(10) Patent No.: US 7,134,285 B2
(45) Date of Patent: *Nov. 14, 2006

(54) ADIABATIC POWER GENERATING SYSTEM

(76) Inventor: Indru J. Primlani, P.O. Box 3022, Renton, WA (US) 98056

( * ) Notice: Subject to any disclaimer, the term of this patent is extended or adjusted under 35 U.S.C. 154(b) by 0 days.

This patent is subject to a terminal disclaimer.

(21) Appl. No.: 11/105,130

(22) Filed: Apr. 12, 2005

(65) Prior Publication Data

US 2005/0172631 A1 Aug. 11, 2005

Related U.S. Application Data

(63) Continuation-in-part of application No. 10/733,898, filed on Dec. 11, 2003, now Pat. No. 6,955,052.

(51) Int. Cl.
F02C 6/04 (2006.01)
F02C 7/08 (2006.01)

(52) U.S. Cl. .................. 60/784; 60/731; 60/39.52

(58) Field of Classification Search .............. 60/75, 60/784, 731, 39.52, 39.5, 775
See application file for complete search history.

(56) References Cited

U.S. PATENT DOCUMENTS

| 3,358,656 | A |   | 12/1967 | Panhard |            |
|-----------|---|---|---------|---------|------------|
| 3,775,973 | A | * | 12/1973 | Hudson  | 60/39.25   |
| 4,024,703 | A | * | 5/1977  | Hudson  | 60/773     |
| 4,204,703 | A | * | 5/1980  | Okada   | 280/734    |
| 4,205,638 | A |   | 6/1980  | Vlacancinch |        |
| 4,693,075 | A | * | 9/1987  | Sabatiuk | 60/39.39  |
| 5,237,811 | A | * | 8/1993  | Stockwell | 60/39.39 |
| 5,771,682 | A |   | 6/1998  | Simons  |            |
| 5,960,625 | A | * | 10/1999 | Zdvorak, Sr. | 60/39.34 |
| 6,203,587 | B1 |  | 3/2001  | Lesieur et al. |      |
| 6,527,828 | B1 |  | 3/2003  | Flippo et al. |       |
| 6,532,743 | B1 |  | 3/2003  | Fischer |            |
| 6,545,191 | B1 |  | 4/2003  | Stauffer |           |
| 6,955,052 | B1 | * | 10/2005 | Primlani | 60/776    |

OTHER PUBLICATIONS

Winged Worriors, 1963 Chrysler Turbine Car.
1963 Chrysler Turbine Car.
Gas Turbine Vehicles by Chrysler Corp.
Motor Life-GM's New Turbine Car Apr. 1954.

* cited by examiner

Primary Examiner—Charles G. Freay
(74) Attorney, Agent, or Firm—Seed IP Law Group PLLC

(57) ABSTRACT

An adiabatic power generation method and apparatus includes at least one combusting device to combust any suitable fuel and an oxygen-containing gas to produce hot high pressure combustion gases. Also includes modified present art combustors, wind and solar energy sources. A portion of the expanded gases, or ambient air is mixed with the combustion gases to form a mixture of gases as working fluid that is fed to a work-producing device.

44 Claims, 11 Drawing Sheets

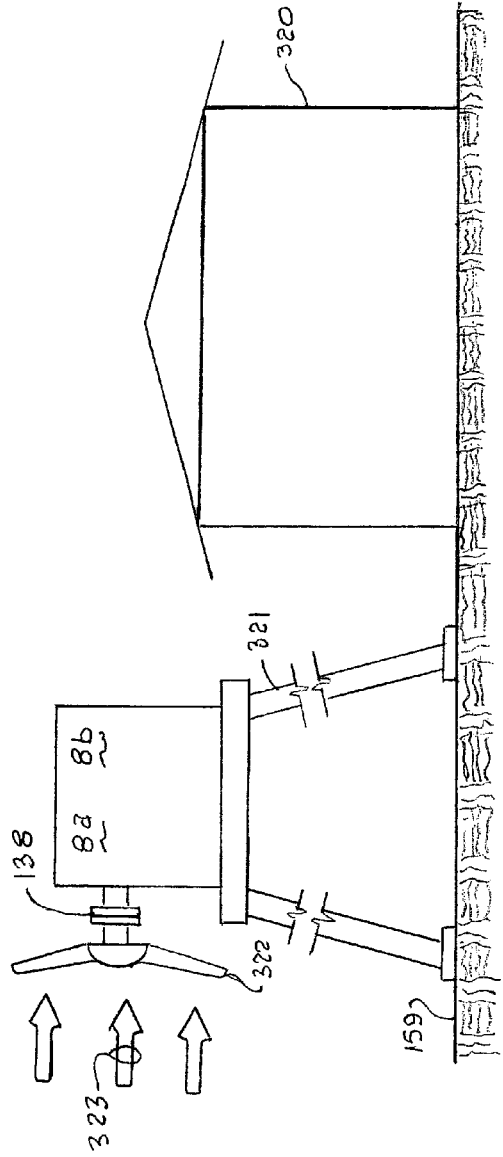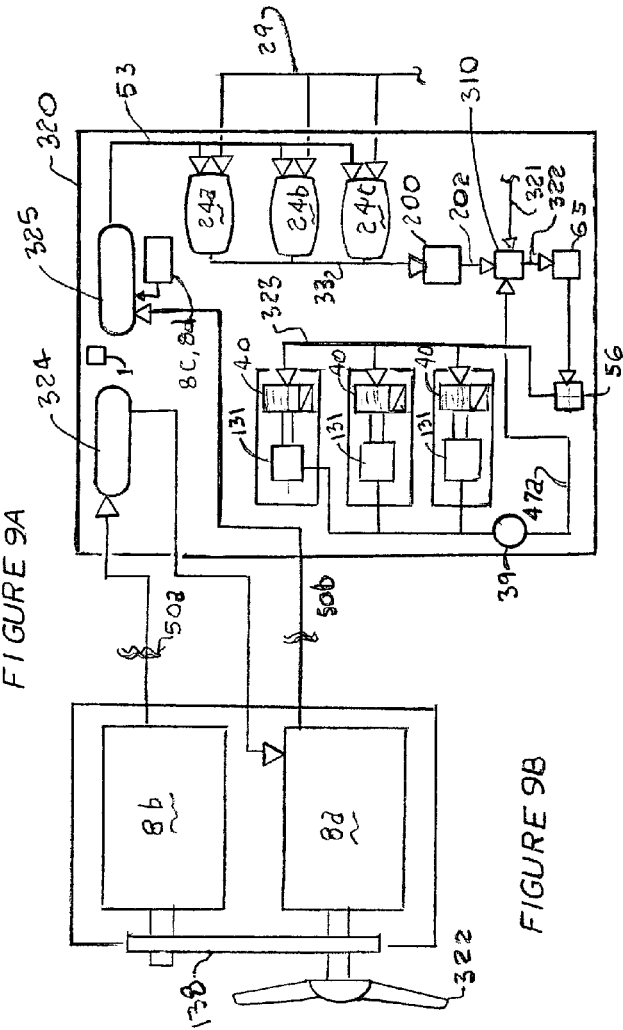

ADIABATIC POWER GENERATING SYSTEM

CROSS-REFERENCE TO RELATED APPLICATION

This application is a Continuation-In-Part of my application with Ser. No. 10/733,898, filed Dec. 11, 2003, now U.S. Pat. No. 6,955,052, issued Oct. 18, 2005, the contents of which are incorporated herein by reference thereto.

BACKGROUND OF THE INVENTION

State of the art engines have thermal efficiencies in the range of 30 to 40%. This is due to heat lost by system cooling, friction of moving parts and energy lost in exhaust gases. In order to meet atmospheric emission standards additional energy is used to condition exhaust gases for reducing the toxicity.

Most engines use the internal combustion process. Steam engines use external combustion. Gas turbines operate with pressurized gases at very high temperatures. The turbines have a very high power to weight ratio but are not good for partial loads; they are very costly because of high temperatures and speeds of operation. Jet engines use gas turbines for propulsion. Turbofan engines are more efficient due to pick up of heat from the shell of the jet engine. Engines operate with increasing entropy due to irreversible heat transfer processes during operation of cooling systems, exhaust systems and accessories. Some engines internally provide power from gas turbines with exhaust gases to drive air compressors to increase the density of combustion air and to increase the mass of Oxygen in the air introduced into the engine for increased power output. Operating at higher altitudes aspirating engines produce less power. All engines require special considerations for materials used for internals subjected to high temperatures and pressures. Bearing and other moving parts are subject to short term high temperature yield stresses, short term ultimate yield, rupture strength, creep strength, relaxation strength, high temperature endurance limit, thermal expansion, corrosion and failures due to fatigue and natural frequencies of operation.

The primary object of this invention is to substantially reduce the cost of manufacture and operation of an energy-producing system with less impact on the environment. Specifically the following objects are cited:

a. Conserve energy of fuel combustion, compressed air and unburned fuel instead of discharging it through coolants and high temperature exhausts;

b. Conserve energy remaining in expanded gases issuing from a work-producing zone by circulating expanded gases in a closed loop with gaseous combustion products exhausted;

c. Maximize combustion of fuel and preferably obtain complete combustion with reduced flame temperature, so products of combustion contain only traces of Hydrocarbons and Carbon Monoxide and Oxides of Nitrogen;

d. Eliminate or minimize the need for treating exhaust gases for toxicity and noise.

e. Operate present art combustors with modifications to function as more efficient adiabatic power systems.

f. Use wind energy and/or solar energy to provide compressed air, including heated compressed air, with or without combustion or other uses in the invention.

BRIEF SUMMARY OF THE INVENTION

The present invention provides an adiabatic power generating system, which comprises:

a. Means for combusting a combustible mixture of a fuel and an oxygen-containing gas to form a gaseous combustion product at a first range of elevated temperature and pressure;

b. Means for conducting the gaseous combustion product to a thermally insulated mixing means downstream of the combusting means, c. Means for introducing into the mixing means a secondary gas at a second range of temperature and pressure lower than said first range to form in said mixing means an admixture of gases as a working fluid at a third range of temperature and pressure intermediate the first and second ranges, and d. Means for conducting said working fluid to a work-producing means operable to produce the work by expansion of said working fluid.

The combusting means useful in the present invention may be at least one thermally insulated gas reactor of substantially constant volume. The combustion means may also be enclosed within a housing and having heat exchange means in heat exchange relationship with the housing, the heat exchange means being operable to transfer heat arising from combustion of the combustible mixture by the combustion means to a heat exchange gas and to conduct at least a portion of the heated heat exchange gas as working fluid to the work-producing means for expansion therein. In both cases the heat losses from the system are minimized and the system operates at least substantially adiabatically.

The temperature and pressure of the combustion product gases are suitable for generation of large amounts of power. When smaller power outputs are desired, the temperature and pressure and flow of the combustion product gases will be reduced.

The system of the present invention may use a compressor driven by a wind turbine to provide compressed air for direct power or combustion in the above-mentioned combusting means. Further, the present invention also provides solar energy means for heating the ambient or compressed air in the combusting means. When the solar energy is high, the thus heated compressed air in the combusting means, by itself, may be used as the working fluid. In wind energy systems, compressed air alone can be used as a working fluid based on cost and performance considerations.

The advantages and benefits of this invention include the following:

Engines of presently operating vehicles can be replaced with gas motors comprising simple low cost turbines or double acting reciprocating piston devices to produce more power and improved fuel economy. The replaced units have less inertia, less friction and longer life with simple and permanent lubrication [no oil changes required]. Also the power system of the invention releases less toxic pollutants and Global warming gases.

Portable and stationary power plants using the invention will cost less to fabricate and less to operate. Self-propelled power plants will be lighter than the state of the art and atmospheric emissions are expected to exceed EPA standards.

Operation and maintenance of the present invention is more cost efficient because the power system has no moving parts except for auxiliaries. Problems due to high temperatures in apparatus in a static condition is significantly easier than for apparatus in dynamic conditions.

The gas turbine systems and internal combustion engines of the prior art can be retrofitted or replaced by the adiabatic power generating systems of the invention with significant advantages.

A continuous electrical power supply is provided by hybridization by harnessing wind energy and/or solar energy with a suitable fuel, preferably a bio-fuel. The system will generate electrical power at substantially lower life cycle costs, enabling lower utility rates with substantially less pollution than conventional power plants.

Other advantages are described herein after.

BRIEF DESCRIPTION OF THE DRAWINGS

FIGS. 9A and 9B are schematic views of a wind turbine system of the invention.

DETAILED DESCRIPTION OF THE INVENTION

Figure 1:
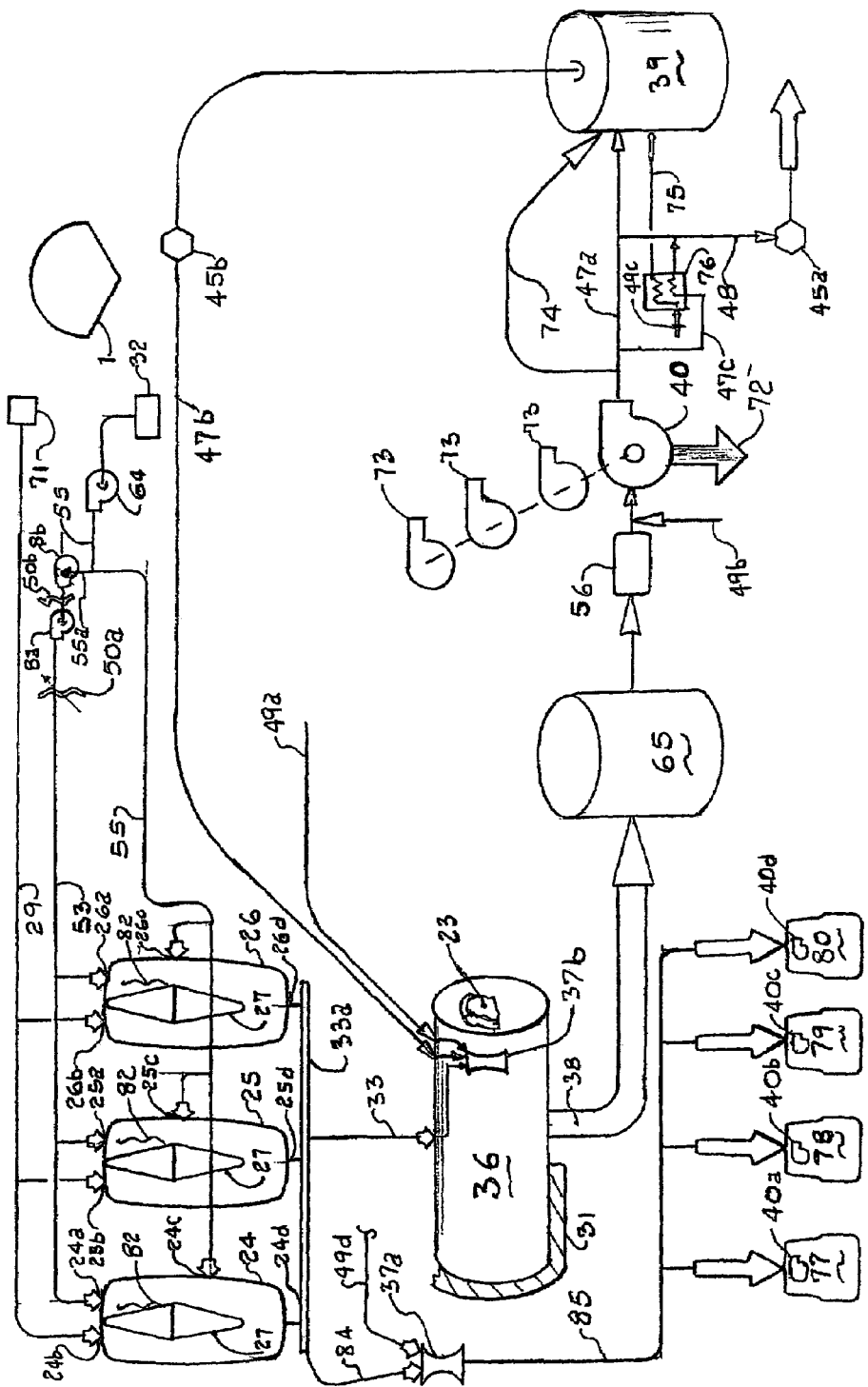
FIG. 1 is a schematic view of an embodiment of the process and apparatus of the invention.

With reference to FIG. 1, three gas reactors 24, 25 and 26 are controlled by computer 1 to operate in sequence as described in detail below. Each reactor 24, 25, and 26 is sealed and has a predetermined volume. An oxygen-containing gas, preferably compressed air at a pressure of from about 25 to 500 PSIA, preferably from about 100 to 150 PSIA, is charged into each reactor 24, 25 and 26. [For convenience the oxygen-containing gas will be referred to as compressed air.] Compressed air is provided via supply line 53 and air inlets 24a, 25a and 26a. After charging the reactors with the compressed air, a combustible fuel, preferably compressed natural gas or pressurized ethanol, containing about 5 to 15 percent water, is charged into the reactors 24, 25 and 26 from fuel supply 71 via line 29 and fuel inlets 24b, 25b and 26b. After charging the reactors with the compressed gaseous fuel or pressurized liquid fuel, the pressure in each reactor is approximately equal to the pressure of the compressed air. The reactors 24, 25 and 26 are charged with an amount of compressed air in excess of the stoichiometric requirements for combustion of the fuel.

Preferably, water is also charged into the reactors 24, 25 and 26 via water inlets 24c, 25c and 26c from water pump 64 and line 55 which draws water from water reservoir 32. Water pump 64 also supplies water, if desired, via line 55a directly to the air compressor 8b with cooled compressed air flowing through line 53 from second stage compressor 8a that has been cooled in heat exchangers 50a and 50b and may be further cooled by evaporating water.

Figure 3:
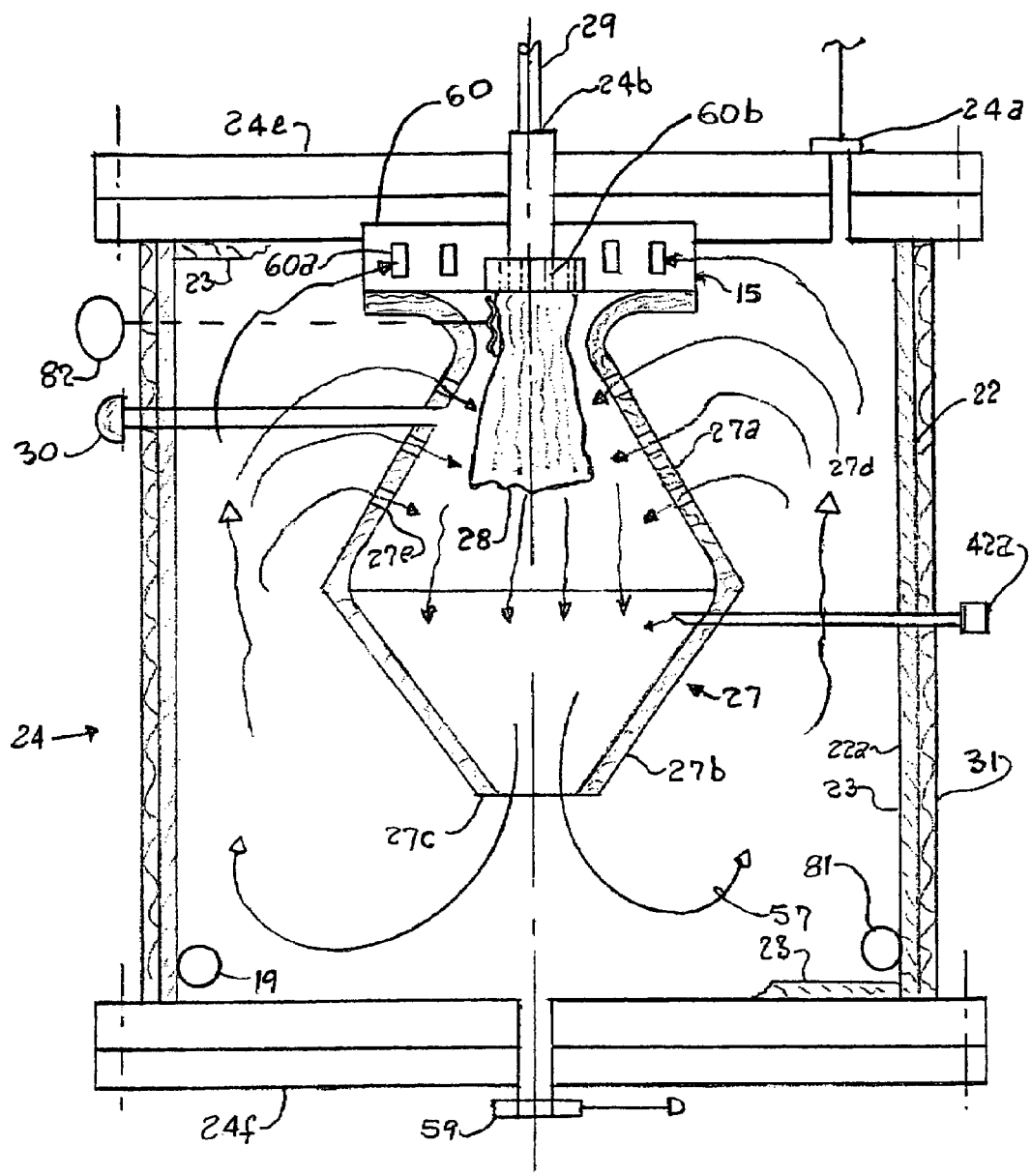
FIG. 3 is a detailed view, in section, of a preferred embodiment of a gas reactor employed in the invention.

After a combustible mixture of fuel and compressed air has been charged into the reactors, the combustible mixture is ignited by igniter 82, first in reactor 24 and then in reactors 25, 26 to produce a flame propagating in the flame retainer 27 [FIG. 3]. Gaseous combustion products at an elevated temperature of from about 2100° F. to about 3000° F. and at an elevated pressure of from about 800 PSIA to about 4000 PSIA, exit reactor 24 via outlet 24d and are charged into mixing tank 36 via manifold 33a. Mixing tank 36 has an internal high temperature lining 23 and external insulation 31. The combustible mixture is sequentially ignited in reactors 25 and 26 such that there is a substantially continuous flow of gas into mixing tank 36 from reactor 25 and outlet 25d and then from reactor 26 and outlet 26d via manifold 33a. At the end of each cycle of sequential ignition, a new cycle is commenced in the same manner as described above. If desired, more than three reactors or as few as one reactor may be used.

The gases of combustion at elevated temperature and pressure enter tank 36 via line 33 and exit tank 36 via line 38 and flow into accumulator tank 65 and thence into rotary gas motor 40, which is controlled by motor speed and torque controller 56. The gas motor 40 expands the gases charged therein and the work produced is collected via line 72 in a conventional manner. If desired, several gas motors 73 can be arranged in series-parallel to receive the gas from accumulator tank 65 to provide a distributive power system.

In a preferred embodiment of the invention, a portion of the expanded gases exiting gas motor 40, as secondary gases, are passed through line 47a and/or line 74 into accumulator tank 39. The secondary gas exiting tank 39, at a pressure of from about 15 to 30 PSIA and a temperature of about 140° F. to 200° F., is sent to mixing tank 36 via line 47b and gas scrubber 45b to remove entrained moisture.

Alternatively, gases exiting gas motor 40 through line 47c, passes through condenser 76 to preheat ambient air introduced via line 49c. The preheated ambient air stream is in fluid communication with accumulator tank 39 via line 75. Exhaust gases may be exhausted through line 48 and gas scrubber 45a and become a part of the exhaust stream that is exhausted.

Generally when the gas motor powers a self propelled vehicle [not shown] substantial energy expended to drive said vehicle may be recovered by converting said gas motor 40 to a power driven generator by virtue of the momentum energy of said vehicle. This is accomplished by controller 56 and means to shut off power gases while opening ports [see FIG. 2] to admit ambient air 49b to be pressurized within gas motors 40, 73. The pressurized air by means of gas valves [not shown] is in fluid communication via line 74 with accumulator tank 39. Depending on pressures developed the pressurized secondary gases may be directly transferred to buffer tank 65 as a working fluid. [conduit means not shown].

Figure 7:
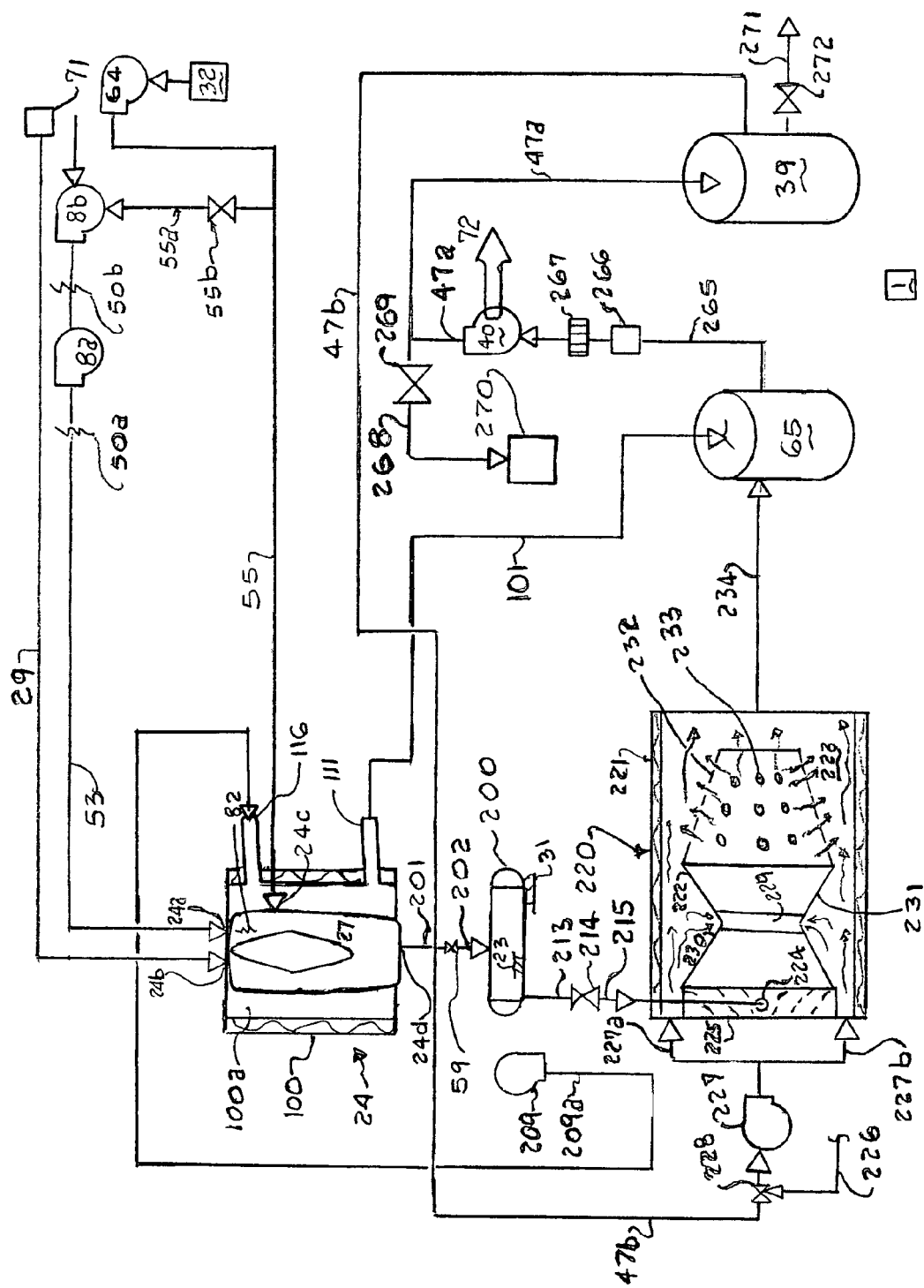
FIG. 7 is a schematic view of another embodiment of the invention.

If desired, the ambient air can be charged into mixing tank 36 via line 49a instead of the recycled expanded gas [secondary gas] in line 47b. Note, that ambient air 49a may require a blower to introduce ambient air into mixing device as is shown in FIG. 7. In any case, it is preferable to admix the combustion gases exiting the reactor 24, 25, 26 with a lower pressure and temperature secondary gas, such as the recycled expanded gas or ambient air, in a ratio by mass of about 3 parts to about 6 parts of secondary gas to about one part of the combustion gases. In cases of miniaturization, smaller flows of high pressure and temperature gas will be required. This has several advantages. First, this provides a substantially improved thermal efficiency, because heat in the combustion gases is transferred to the secondary gases and is not lost to the environment. Further, by reducing the temperature and pressure of the power gases in line 38 sent to the gas motors, the cost of building and operating the gas motors is substantially reduced and the operating life is substantially extended. Moreover, mixing the product combustion gases with the secondary gases increases the volume of the power gases [working fluid], which in turn enable the gas motors to produced the desired horsepower output more efficiently.

Because the mixing tank 36 and the reactors 24, 25 and 26 are thermally insulated, the combustion occurs under at least substantially adiabatic conditions and heat losses are substantially reduced, which increases the thermal efficiency of the system. If desired, the hot combustion product gases exiting the reactors can be sent via lines 84 and 85 and eductor 37a, which will induct ambient air from line 49d, to form a mixture of gases, which in turn is sent to a space heating system 77, a distributive cooking system 78, a hot water system 79 and/or a clothes dry system 80. In each case, the combustion gases mixed with ambient air are expanded in gas motors 40a, 40b, 40c and 40d and provides the energy to drive the gas motors and the heat required to operate these systems.

Figure 4:
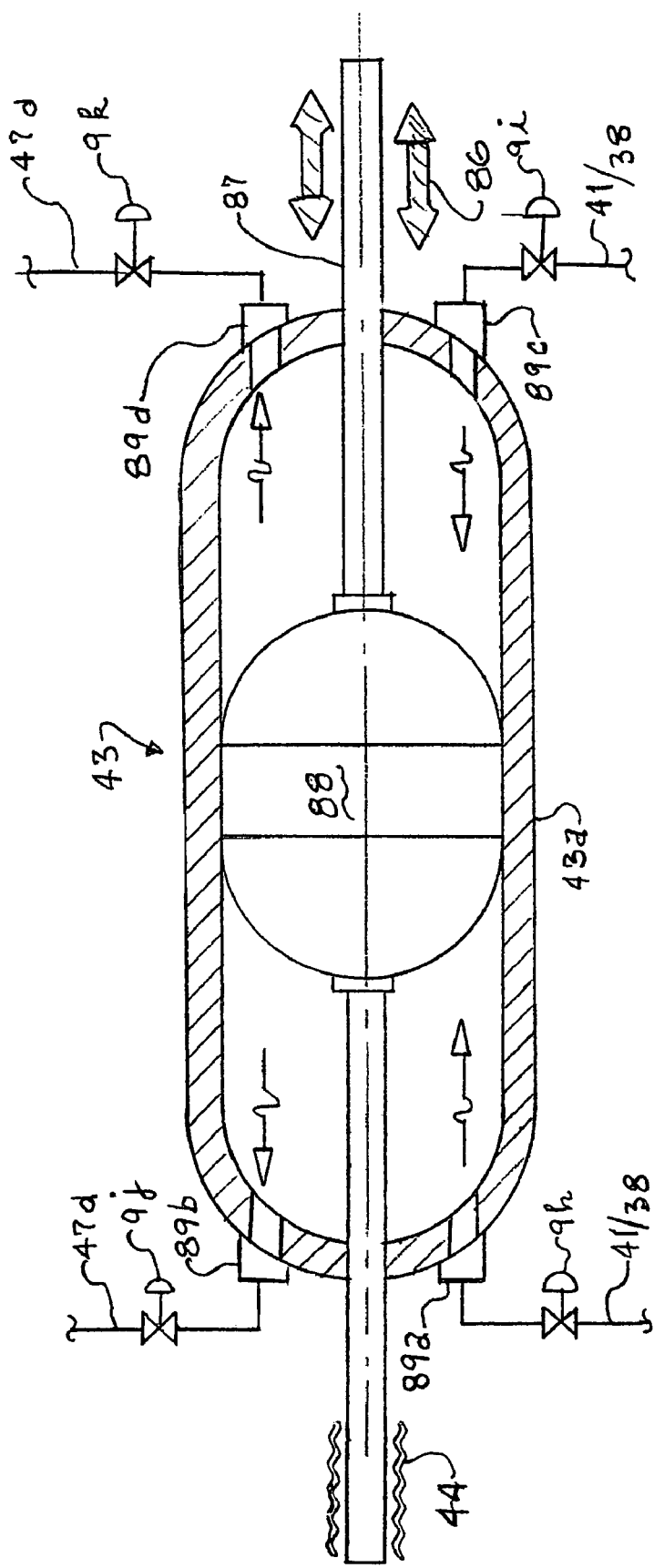
FIG. 4 is a detailed view, in section, of a double acting free piston gas motor that can be used in the invention.

As seen from the description of FIG. 1 above, the thermal compression engine assembly comprises at least one gas reactor, and preferably comprises a bank of gas reactors. The reactor effluent is at elevated pressure and temperature and preferably is mixed with low-pressure secondary gases. By increasing the pressure of the compressed air, the pressure of the reactor effluent is also increased. Power Gases produced are expanded through mechanical devices such as rotary gas motors 40, 73 and double acting reciprocating pistons as shown in FIG. 4 to produce useful work such as electrical or mechanical output.

Accessories may include a fuel system and compressed air charging system. Preferred fuels are Ethanol, compressed natural gas, hydrogen and good grades of coal gas. The air compressor is charged with water that is evaporated in an amount required to absorb heat of compression. Also compressed air is cooled in between stages of compression and further cooled before charged into the reactor vessels.

The fuel burns in the reactors to develop reactor gases that are products of combustion and excess air remaining in the reactor. These products of combustion are at elevated temperature and pressure and including additives contain all the energy developed in the system. The enthalpy in the reactor effluent includes the enthalpy of all influents into the reactor. The influents contain the energy in the fuel charge, energy stored in the compressed air charge and heat due to exothermal reaction and chemical changes as a result of burning of the fuel. The reactors operate cyclically. During the first part of the cycle the fuel burns to develop the elevated temperature and pressure gas in a programmed time or set point temperature. Subsequently the reactor gases at elevated temperature and pressure are displaced by Secondary Gases in the reactor chambers and also mixed with further Secondary Gases that are inducted into a mixer powered by the inductive forces of the high-pressure products of combustion. The intimately mixed gases are buffered in a mixing chamber adjacent to or contiguous to the reactors to yield Power Gas or working fluid used in the work zone at a temperature and pressure less than that of the reactor gases and more than the temperature and pressure of the Secondary Gases. A plurality of gas reactors subsequent start and operate in a sequence such that a constant stream of products of combustion are available as demanded by the driven loads. Each reactor new cycle starts when reactor chambers are charged with fresh compressed air.

At partial loads, the reactor gas, secondary gas and Power Gas or working fluid are modulated by automatic adjustment of flow and pressure. When operating at maximum load the reactors operate in continuous sequence to maintain continuous flow to produce a steady stream of power gases. During this process one bank of reactors is in the charging and firing cycle while another bank of reactors is in the mixing and gas supply mode. Additional reactors are used depending on the load characteristics. The power Gas is stored in an accumulator tank to enable an adequate and continuous supply to the gas motors. Hydro-cyclones may be provided to scrub the gases and remove condensed water that is stored in a wastewater tank and a water pump can be used to inject water into air compressors and gas reactors. Chemicals may be added to maintain water at a predetermined chemical purity. Chemical impurities can be precipitated and removed by filtration.

Figure 2:
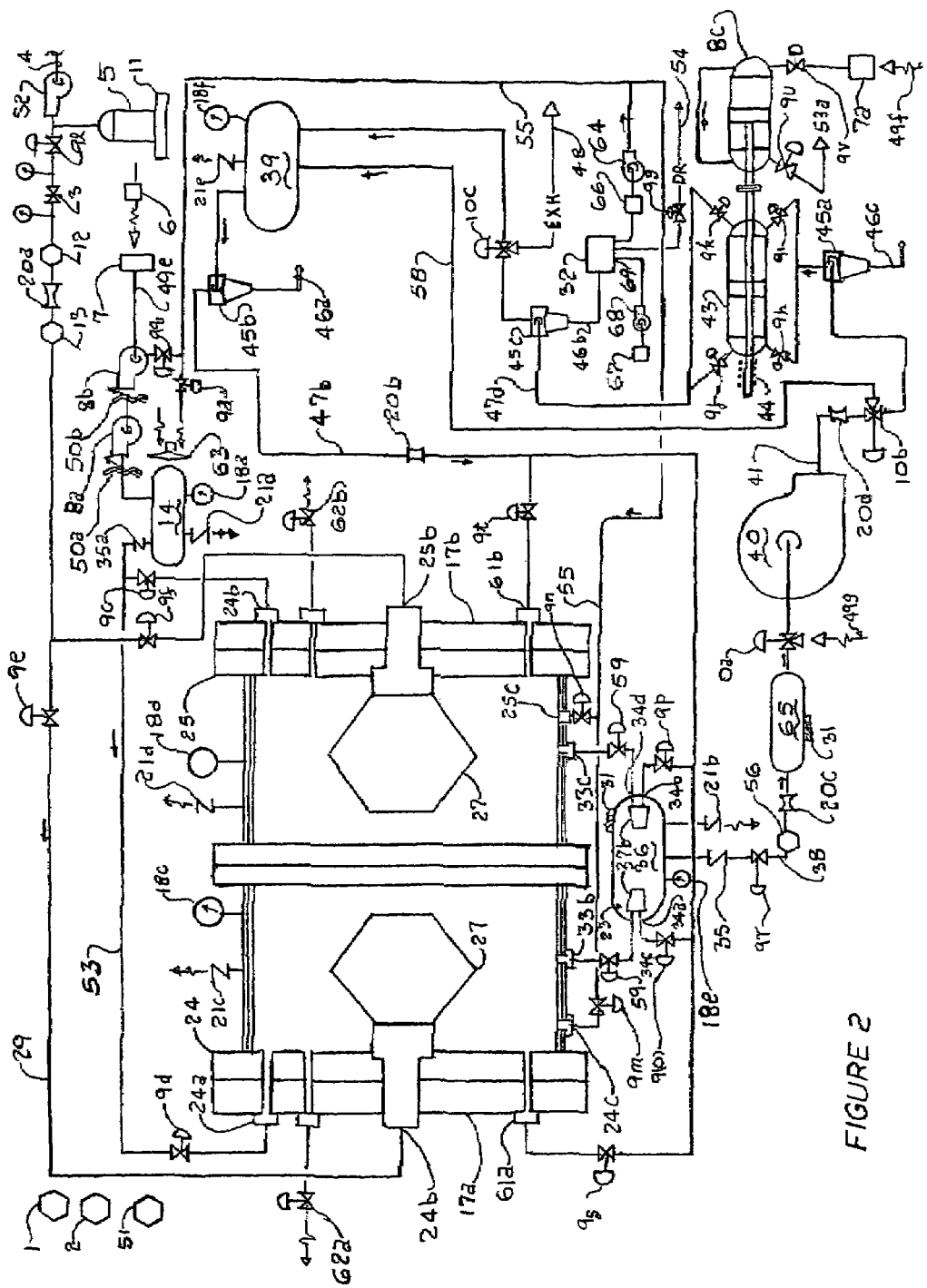
FIG. 2 is a schematic view of another embodiment of the invention.

Gas reactors may be fabricated from a straight section of pipe with pressure-tight end plates 17a and 17b [FIG. 2] and means for restraining reactor vessels from thermal expansion, such as external bolts attached to flanges at both end if the reactor [not shown]. At a first end the of the gas reactor cavity, a ceramic lined flame retainer is concentrically placed. The flame retainer [FIG. 3] preferably has a perforated diverging and solid converging section terminating in a gas ejection nozzle 27c. The interior walls of the Gas Reactor are lined with refractory high temperature insulation 23 and exterior walls may be insulated if a outer shell heat exchanger is not installed. All systems are automatic with computers monitoring and control. All tanks and the reactor are fitted with over pressure valves for safety [FIG. 2, 21c and 21d]. Pressure, temperature, flow meters, timers, oxygen sensors and other sensors regulate the process. See FIGS. 2 and 3—items 18, 19, 20, 51, 81. Said Gas Reactor cavity is partitioned into a first Chamber within said flame retainer and Second Chamber at annulus between exterior of flame retainer and interior perimeter of said Gas Reactor.

With reference to FIG. 3, the fuel and Oxygen-containing gas are intimately mixed by induction due to the expansion of the higher-pressure fuel entering the flame chamber 27. The intimately mixed fuel and oxidizing gases are introduced into burner nozzle ring 15. The fuel is introduced into chamber inside said flame retainer 27 in a modulated fashion to optimize the time of fuel cut-off before the end of the cycle such that there is preferably no raw fuel left in the products of combustion. Electronic igniter 82 initially lights the flame 28. The burning fuel generates heat. The products of combustion flow from the first end 24e of the reactor 24 toward the second end 24f of the reactor into the diverging section 27a of the flame retainer 27. The products of combustion are ejected from the nozzle 27c on the downstream end of the solid converging section 27b of the flame retainer. The thermodynamic process in the reactor is substantially constant volume adiabatic whereby the temperature and pressure of the reactor gases increases to a predetermined value. The hot products of combustion ejected via nozzle 27c as gas stream 57 are mixed with the compressed air charge resident in the annulus space 27d between the flame retainer 27 and the interior 22a of the gas reactor. Rapid gas circulation is setup with gases flowing from within chamber 27 into annulus 27d of the gas reactor. The buoyancy of the circulating gas drives air into the flame ring structure 60 containing air inlet nozzles 60a and fuel inlet nozzles 60b which are symmetrically arranged with respect to the longitudinal axis of reactor 24. A second stream passes through perforations 27e in the diverging section 27a of the flame retainer 27. At the same time the circulation of the reactor gases cools the flame and reduces the $NO_x$ produced. Also local circulation of said reactor gases brings all the species in the gases in intimate contact thereby completing combustion of fuel components including substantial conversion of Hydrocarbons and Carbon Monoxide to steam and Carbon Dioxide. When the reactor gases reach a predetermined condition, the reactor gases are discharged into a mixing tank 36 as described herein.

To complete the description of FIG. 3, sight glass 30 is provided in a customary fashion. Thermocouple 19 monitors the temperature while the oxygen sensor 81 monitors the oxygen concentration, the outputs of which are sent to computer 1. Air inlet 24a and gate 59 are described with respect to FIG. 2 below. Each reactor 24, 25, 26 has interior insulation 23 and exterior insulation 31.

The expansion devices shown in FIGS. 1 and 2 above [and FIGS. 5, and 7–10 hereinafter] may be gas motors, including low temperature and low-pressure turbines, single or double acting reciprocating piston or other suitable devices. Gas motors are adapted to specific applications, such as a power plant for auto-propelled units. Rotary gas motors have operating characteristics that match loads and when used in suitable configuration can be used as torque converters obviating conventional gears and transmissions. Double-acting free piston gas motors controlled with automatic gas flow valves are suitable for other load applications. For instance, reciprocating units are used as a subsequent expansion device following a rotary gas motor. Design of reciprocating free pistons includes stroke length and volume displaced to obtain gas expansive power at the tail end of the power cycle. This system also has the flexibility of operating at full pressure [like a hydraulic cylinder]. The average pressure is double compared to present reciprocating engines. The linear-generators used with double acting reciprocating gas motors have capacity control and electronic controls by modulating magnetic forces for efficient operation. Gas motors for racing vehicles using this invention will have maximum indicated pressure that will exceed the state of the art operating on a mean effective pressure that is about 50% of the maximum pressure. This advantage provides an opportunity for challenging land and water vehicle speed records. Also with power regeneration during deceleration around turns and obstacles, power gas regeneration will boost performance and reduce fuel use. The art of design of racing vehicles depends on features provided in this invention merged with design to reduce weight, wind resistance and stability of the vehicle.

The oxygen-containing gas is preferably compressed air. The oxygen concentration of the air can be increased by further compression and cooling of the compressed air to make the reactors physically smaller. In a remote process, air can be enriched with oxygen. Compressed air can be directed to a pressure swing adsorption (PSA) unit that strips the nitrogen from the air resulting in air containing a higher concentration of oxygen.

Reactor gases at elevated temperatures and pressures can be used more efficiently for space heating systems with a variety of fuels. For cogeneration the higher pressures are used for powering gas motors to produce electricity. For space heating, the ambient air is charged with hot reactor gases to produce warm air that is circulated in occupied spaces for comfort. Elevated temperature and pressure gases are bled into the secondary gases as required. Also building air quality is improved by charging excess air into the reactors and by mixing ambient air with the power gases as shown, e.g. in FIG. 1. See eductor 37a. The gas pressure drives the air through the air distribution system and filters. Auxiliary fans may be used for exhaust and ventilation, while relief dampers can maintain building air balance. Also, on further expansion of the working fluid, the low temperature exhaust is cool enough to absorb air conditioning space cooling loads.

Mixing of high pressure and high temperature gases with low pressure and temperature gases to yield an intermediate pressure and temperature working fluid is accomplished with the best available art based on empirical data unique to the operation of a specific system to minimize useful energy losses for obtaining the best available overall efficiencies. Mixing methods discussed herein are viable methods and are included to facilitate describing a complete process.

Some other typical uses for the elevated temperature and pressure gases are distributed to numerous sites for cooking, heating water and drying clothes and other purposes. The fuel is selected as most appropriate for the application. Homes and smaller buildings can be standardized with all 120 volts power and avoid using 240 volts single-phase electrical power. Instead of using electrical power, appliances can utilize high temperature and pressure conditioned gas to operate controls with thermoelectric power and gas motors. Building service voltages can be provided with more efficient voltages from the utility as 208 volts and 460 volts. Electrical power from utilities are inefficient and on a macro scale produce significant environmental impact, are exposed and subject to sabotage and self controlled rolling brown out and blackouts by means of switch-gear designed to trip during ground fault or short-circuit condition. Also substations are used in numerous locations in urban and rural areas and are vulnerable to damage by lightning and other forces. Less dependence on the grid improves the reliability of operation of the building.

PREFERRED EMBODIMENT ONE

Gas Reactor Engine System

This embodiment is preferably a power plant for a self-propelled vehicle.

With reference to FIG. 2 and 3 and 4, the system depicted represents a design of a 220 HP output using compressed natural gas as the fuel. The expected indicated efficiency is 85% and brake efficiency is 79%. Two Gas Reactors, 24 and 25 operate in sequence so that there is a continuous flow of products of combustion. There are many variations to the composition of natural gas. This embodiment is presented as burning 100% Methane. The system is programmed for monitoring and automatic control with a suitable computer 1 and master timer 51 with provisions for manual and override controls. The useful work output of the gas motors is electrical or mechanical. Electrical energy is stored in a bank of batteries, 2. The process of operation is described below.

Ambient air at 60° F. and 50% relative humidity passes through air intake 6 and filter 7 and the gas stream of filtered ambient air 49e flows into two stage compressors 8a and 8b and through inter-stage cooling 50a and 50b. Water is injected into air compressor 8b by opening valve 9q and to further cool the compressed air to 90° F. by evaporative cooling system 63 with water from water pump 64 via line 55 and thence through water flow control valve 9a. The compressed air is stored in accumulator tank 14 with pressure sensor 18a and overpressure valve 21a. In the first cycle reactor 24 is charged with compressed air. The oxidizing gas stream, 53 is compressed air at 125 PSIA flowing at a rate of 21.4286 cubic feet per minute with valve 35a to prevent reverse flow. During compression 0.3684 pounds of water per minute is injected into the compressor. Also 0.072 pounds of water is entrained in the ambient air sucked in by the compressor.

The liquid natural gas cylinders 5 are on electronic weigh scale 11 in 60° F. environment. Alternatively the fuel gas is supplied from utility pipe 4 and utility gas compressor 52, through gas manifold 3. The fuel gas valve train 12 is installed to comply with applicable code and safety requirements. The Gas stream flowing in line 29 is 0.4533 pounds per minute 1000 PSIA natural gas with combustion heat input of 10,816 BTU per minute. The fuel gas flow rate in line 29 is regulated by output signals from flow sensor 20a. The reactor cycle is initiated by opening natural gas valves in manifold 3 and valve 91[ell]. The fuel air mixture is ignited with electronic pilot igniter 82 [FIG. 3] and the flame is optimized by thermocouple 19 [FIG. 3]. The fuel/air flash back arrestor 13 prevents the flame from flowing back into the gas system.

The stoichiometric flows of fuel and air are 17.4 pounds of air per pound of natural gas. The fuel is regulated by valves 9e or 9f and supplied to burner nozzle ring 15 [FIG. 3] at fuel ports 24b and 60b [FIG. 3]. The gas entry end of the flame retainer 27 [FIG. 3] has combustion gas openings 60a equally and evenly spaced around the ring 15 [FIG. 3.]. Reactors 24 25 operate in sequence so that a continuous stream of hot gases is produced. Oxygen sensor 81 [FIG. 3] monitors oxygen remaining in each reactor during the process.

Each gas reactor 24, 25 is fitted with a pressure tight covers 24e and 24f and body 22 [FIG. 3]. The reactors 24, 25 and mixing chamber 36 are internally lined with three inches refractory and three inches external insulation. The reactor flame raises the temperature of the mixture of gases to 2783° F. Water in the amount of 0.8571 pounds per minute flow is controlled by valves 9m and 9n and is injected through inlets 24c or 25c. Further 1.02 pounds per minute of water is produced due to fuel combustion. Next the high temperature valve 59 [FIG. 2] opens and 14.9021 pounds per minute of reactor gas at a pressure of 891 pounds per square inch and at 2783° F. [with molecular weight of approximately 27.17 pounds per pound mole] flow into eductor 37b inside mixing tank 36 with pressure monitor and sensor 18e and over pressure relief valve 21b. The other gas stream to eductor 37b is 59.6084 of Secondary Gases at 20 PSIA at 200° F. from tank 39 and through hydro-cyclone 45b discharging wastewater 46a. Control valves 9o or 9p regulates flow of the secondary gas to inlets 34a or 34b. At the same time as the reactor pressure drops due to discharge into mixing tank, the secondary gas controlled by valves 9s and 9t flows into inlet 61a or 61b in reactors 24, 25. The reactor gas stream 33 and the Secondary Gas stream 47b with flow regulated by controller 20b enters ports 34c or 34d to eductor 37b in mixing tank 36. The gases are thoroughly mixed to yield Power Gas or working fluid stream 38 exiting mixing tank 36. One direction flow valve 35 prevents back flow of Power Gases from flowing back into the mixing chamber 36. The Power Gas flows into tank 65 and gas flow is controlled by monitor 20c and valve 9r. While reactor 24 is discharging reactor effluent, reactor 25 starts the charge and firing cycle. Reactors 24, 25 operate to provide a continuous flow of reactor effluent to meet full load demand. Each reactor operates for about seven seconds alternately controls override timer 51 to maintain temperatures and pressures of reactor effluent. Reactors 24, 25 are fitted with over pressure valves 21c and 21d and pressure control monitors 18c and 18d. Vent valve 62a or 62b opens before charging compressed air into reactor so all products of combustion may be scavenged from the reactor vessel.

Power Gases or working fluid 38 at 194.2 PSIA at a temperature of 760° F. and flow rate of 74.5105 pounds per minute are stored in tank 65 for the smooth use of Power Gas supplied to the rotary gas motors 40 to drive the load or vehicle. Power Gas flow rate, temperature and pressure are controlled for a versatile power plant and in some cases transmission gears may not be required. The torque controller 56 of the rotary gas motor 40 is matched to the load characteristics. At low speeds the torque is the higher and maximum at zero speed. The partially expanded Power Gas discharges from the gas motor 40 via line 41 through controller 20d and is passed through a hydro-cyclone 45a. Liquid in line 46c contains a portion of absorbed Carbon Dioxide and Oxides of Nitrogen that are removed and sent to tank 32. Water in tank 32 is controlled for neutral pH with suitable chemicals and external water flush [not shown]. Automatic valve 9g is opened to discharge wastewater 54 to suitable drain. Also during the deceleration mode, valves 10a and 10b on suction and discharge of the rotary gas motor are actuated to direct regenerated gases 58 to tank 39 to be used in the process for developing free energy. Ambient air 49g is drawn in through valve 10a Control valves 9h, 9i, 9j and 9k operate in sequence to drive the double acting reciprocating gas motor 43. The gas motor 43 drives the linear generator 44 and double acting reciprocating air compressor 8c that discharges compressed air 53a through valve 9u and draws in ambient air 49f through filter 7a and valve 9v. The free piston 88 [FIG. 4] is also controlled electronically by controlling magnetic forces in the linear generator. Secondary gas stream then passes through hydro-cyclone 45c and wastewater 46b. Control valve 10c proportions the gas flow so that 14.9 pounds per minute at 200° F. of the gas stream 48 is exhausted and 59.61 pounds per minute of the gas is diverted to tank 39 with over pressure release valve 21e and pressure monitor and controller 18f. The effluent 46 from cyclone is directed to waste liquid tank 32. Water pump 64, with inlet filter 66, supplies water stream 55 to injection points at air compressor 8a, and reactors 24 and 25. Tank 32 has automatic valve 9g to regulate excess water to drain and fresh water supply [not shown]. Chemical handling system for pH control 67 and chemical feed pump 68 supply metered charge to inlet 69 in water tank 32.

With reference to FIG. 4, the gas motor 43 has a free piston 88 with oscillating shaft 87 inside cylinder 43a, coupled to linear generator 44 and external load 86. Partially expanded gas in line 41 or Power gas in line 38 enters the cylinder 43a through solenoid valves 9h or 9i into ports 89a or 89c. Expanded secondary gas exits ports 89b or 89d and through solenoid valves 9j or 9k and then flows through line 47d as described above.

The capacity of the tanks is less than 10 cubic feet. Sizing of accumulator tanks will be significantly influenced by size and space limitations and fine tuning gas flows to ensure smooth operation of the gas motors under all designed load conditions.

PREFERRED EMBODIMENT TWO

Ethanol for Self-Propelled Power Plant

Generally this embodiment is the same as Embodiment One. Ambient air and compressed air conditions are generally the same. Each gas reactor cavity is four cubic feet to provide adequate mass of air and products of combustion to lower reactor temperatures. In this Embodiment the thermal compression engine operates by burning ethanol containing 95% fuel and approximately 5% water including denaturing agents. A state of the art fuel injection system is installed to operate the gas reactor on a variant timed cycle initially set at seven seconds. Reactor Gas temperature is approximately 2100° F. and pressure is 736 PSIA. Water is injected into the air compressor at 0.6046 pounds of water per minute. There is enough water in the system produced by combustion and water contained in the fuel—little or no water injection is required. Fuel flow rate is 0.8915 pounds per minute Thermal efficiency is expected to be 85% and brake efficiency is expected to be 79%. The Power Gases or work fluid is at about 600° F. at about 160 pounds per square inch absolute with a flow rate of 113 pounds per minute. Atmospheric emissions are expected to be traces of Hydrocarbons, Carbon Monoxide and Oxides of Nitrogen and less than 2% Carbon Dioxide as a tail pipe emission. Mass emissions from the reactor is expected to be 5% Carbon Dioxide and about 3% mass emissions based only on the combustion process.

PREFERRED EMBODIMENT THREE

Fuel is Ethanol for Stationary Power Plant

This embodiment is suitable for larger plants for utility systems. This embodiment represents a One Megawatts module. The gas reactor is charged with 25 cubic feet compressed air at 125 PSIA. About 3.67 pounds of water per minute based on 0.726 pounds of water entrained by ambient air is charged into air compressors to absorb heat of compression by evaporation to facilitate isothermal compression. The fuel contains ninety five percent Ethanol and about 5% water. The fuel rate is about seven pounds per minute. The Molecular Weight of products of combustion is estimated at 28.32 pounds per pound mole and is close to that of air. The concentration of pollutants in atmospheric emissions is estimated to be traces of Hydrocarbons, Carbon Monoxide and Oxides of Nitrogen and less than 2 percent Carbon Dioxide. The Overall thermal efficiency is expected to be eighty nine percent and brake efficiency is expected to be eight two percent. The pressure of the secondary gases is one hundred and seventy six pounds per square inch absolute at six hundred and fifty degrees F. at the rate of 715 pounds per minute.

Stationary plants are designed for power generation at the lowest possible cost while space and weight do not have significant limitations. The secondary Gas Stream is pre-heated ambient air or re-circulated expanded gases. The water contained in the working gases is extracted in a condenser by expanding to a vacuum, approximately three pounds per square inch absolute. The exhaust gas temperature is about 140° F. Heat of water condensation is recovered. When ambient air is preheated and energized with reactor gases, the pollutants are diluted to 20% concentration in the reactor exhaust stream. The temperature of reactor gases at 2100° F. produces negligible Oxides of Nitrogen while extended "cooking" time with optimum flame modulation, the fuel components combustion is complete producing Carbon Dioxide and water. Further the power generation equipment is shrouded and insulated to recapture radiated heat losses to maximize thermal efficiency. Most processes are substantially reversible with a small increase in entropy. The air compressors are driven by direct power take off from the main power shafts or driven by a separate turbine to avoid irreversible process associated with electrical drives and the higher cost of electrical power. A pony motor is used to maintain compressed air charge in the air accumulator tank for initial startup.

PREFERRED EMBODIMENT FOUR

Solar System

Gas Reactors are installed to use solar energy efficiently and cost effectively. This invention takes advantage of solar energy as a supplemental system or a full-scale solar system. Gas Reactors can be placed under ground with insulated backfill or placed to pick up solar heat directly. A low cost thermal compressor can be built excavating a hole in the ground of a predetermined size and covering the hole with a pressure rated gas tight lid made of suitable solar panels. The walls of the cavity are lined with shotcrete or gunite. Interior of the tank is painted black if plain glass is used as a cover. Provide valves and piping for transfer of fluids. Solar gains raise the pressure of the air inside the tank in direct proportion to the ratio of the original and final absolute temperatures. The energy available is the product of the pressure and volume in the tank and can be used to power turbines for suitable loads. This is a convenient remote source of power that could collect energy for a lower cost than photoelectric cells. This is a method is a for installing a quick low cost electrical power generation system, particularly in Third World countries. Combined with wind powered compression, elevated initial pressures in said underground tank can result in higher final pressures with, perhaps enough storage in a separate insulated tank to provide continuous power around the clock. The degree of sophistication increases as demands on the system increases.

Solar concentration systems are used to heat an heat exchanger medium to about 2700° F. The heat transfer medium is circulated into the reactor to heat pre-charged air or compressed air to about 2500° F. Reactors can be installed at the site or remotely. Solar energy can be collected continuously while reactor energy requirements can be supplemented by a fuel as required. Air is locally compressed with water injection and cooling to approximate isothermal compression; further air-cooling is accomplished with evaporative cooling. Reactor charging air pressure is based on the highest final pressure required in the system. Output for power generation is continuous or operated part-time. Fuel, preferably a bio-fuels, is used based on priority of demands.

Figure 10:
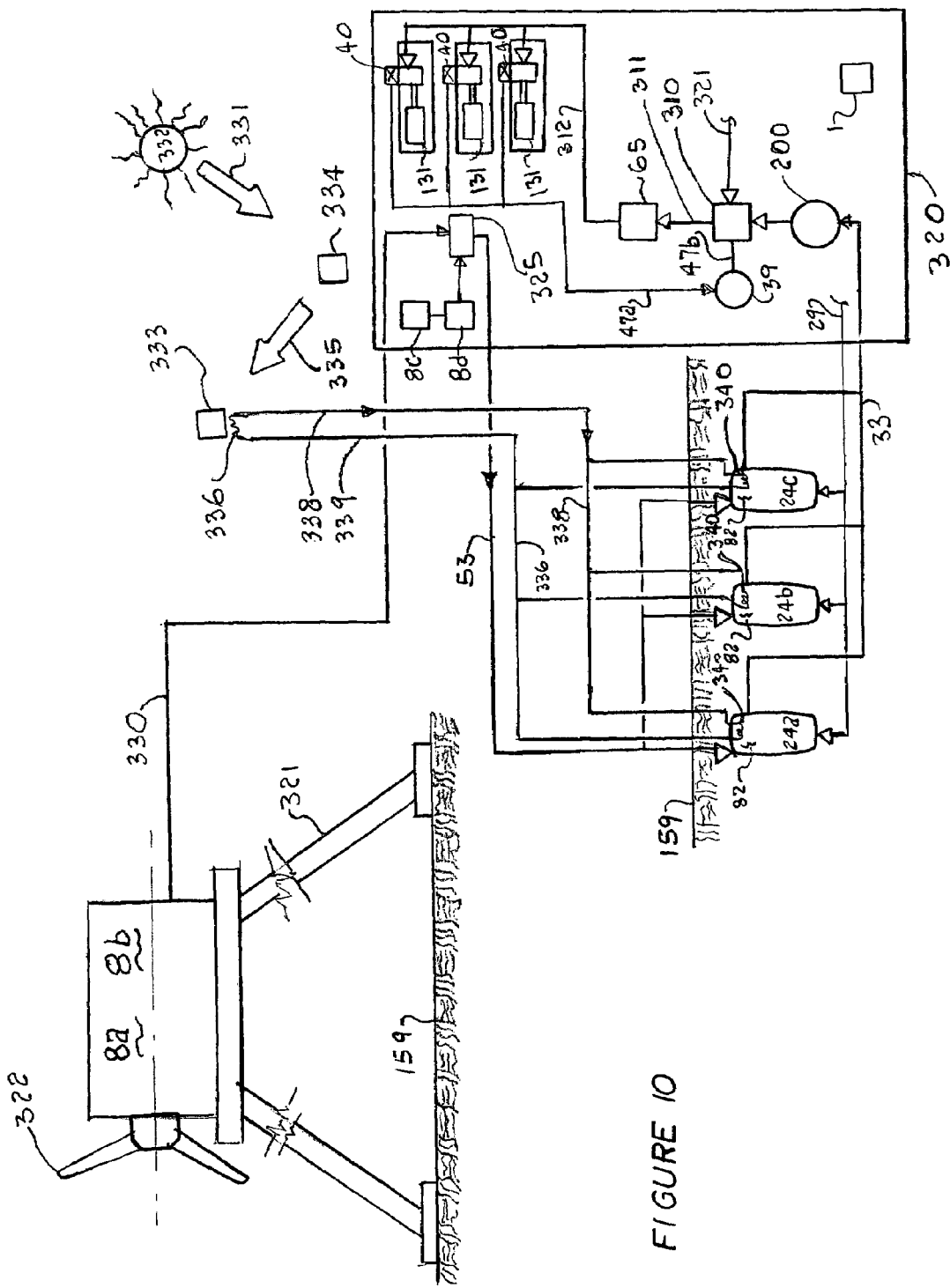
FIG. 10 is a schematic view of a wind turbine and solar energy system of the invention.

Temperatures in the reactors is maintained in the range 2000° F. to 3,000° F. and the pressure of Reactor gases can reach 800 pounds per square inch and higher. Secondary Gases are expanded to below atmospheric pressure and entrained moisture is condensed and heat reclaimed by preheating ambient air in the condenser. Power is generated continuously and fuel used is reduced based on availability of solar energy. Location of plants is expected in areas with high average annual insolation rates [about 7 KWH per square meter] and also away from populated areas with little affect in the regional air quality. FIG. 10 illustrates a system of the invention for generating power using a wind turbine, gas reactors and solar energy.

Figure 5:
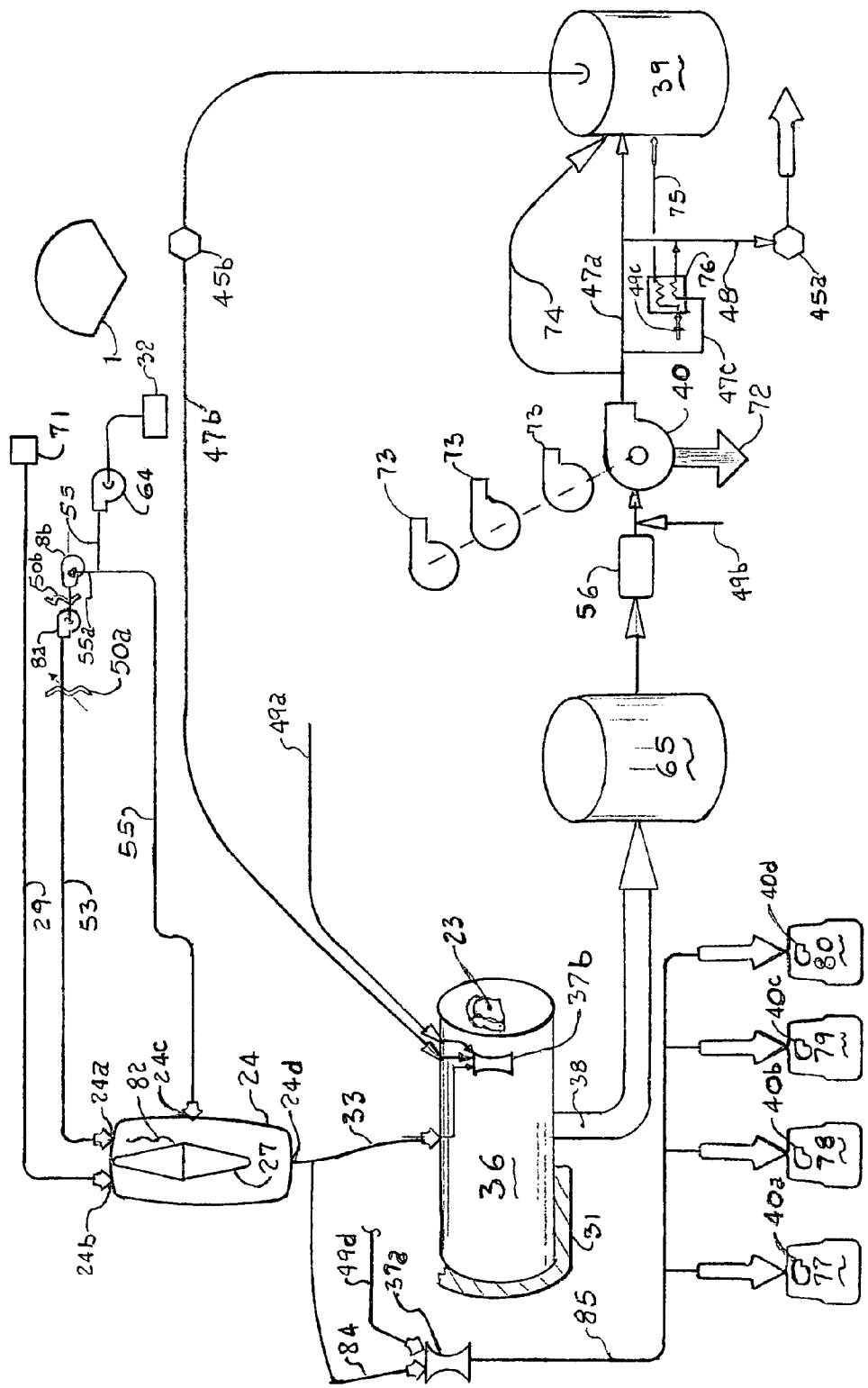
FIG. 5 is a schematic view of another embodiment of the process and apparatus of the invention.

With reference to FIG. 5, a single gas reactor 24 is controlled by computer 1 to operate as described in detail below. An oxygen-containing gas, preferably compressed air at a pressure of from about 15 to 500 PSIA, preferably from about 100 to 150 PSIA, is charged into reactor 24. Compressed air is provided via supply line 53 and air inlet 24a. After charging the reactor or reactors with compressed air, a suitable, conditioned gaseous or liquid combustible fuel, preferably compressed natural gas or pressurized ethanol, containing about 5 to 15 percent water, is charged into the reactor 24 from fuel supply 71 via line 29 and fuel inlet 24b. After charging the reactor or reactors with compressed gaseous fuel or pressurized liquid fuel, the pressure in the reactor is approximately equal to the pressure of the compressed air. The reactor or reactors are charged with an amount of compressed air in excess of the stoichiometric requirements for combustion of the fuel.

Preferably, water is also charged into the reactor or reactors via water inlets such as inlet 24c, from water pump 64 and line 55 which draws water from water reservoir 32. Water pump 64 also supplies water, if desired, via line 55a directly to multi-stage air compressors 8a and 8b with cooled compressed air flowing through line 53 that has been cooled in heat exchangers 50a and 50b and can be further cooled by evaporating water.

After a combustible mixture of fuel and compressed air has been charged into the reactor 24, the combustible mixture is ignited by igniter 82 to produce a flame propagating in the retainer 27. FIG. 3 shows flame retainer 27 in detail and is discussed above. Gaseous combustion products at an elevated temperature of from about 2100° F. to about 3000° F. and at an elevated pressure of from about 800 PSIA to about 4000 PSIA, exit reactor 24 via outlet 24d and are charged into mixing tank 36 via line 33. Mixing tank 36 has an internal high temperature lining 23 and external insulation 31.

The reactor 24 is operated by computer 1 to provide ON and OFF cycles, as required. During the ON cycle, the reactor 24 is charged continuously with fuel and oxygen-containing gas to produce a continuous flow of combustion gases. During the OFF cycle, the reactor 24 is waiting to be activated.

The gases of combustion at elevated temperature and pressure enter tank 36 via line 33 and exit tank 36 via line 38 and flow into accumulator tank 65 and thence into rotary gas motor 40, which is controlled by motor speed and torque controller 56. The gas motor 40 expands the gases charged therein and the work produced is collected via line 72 in a conventional manner. If desired, several gas motors 73 can be arranged in series, parallel or any combination of series and parallel to receive the gas from accumulator tank 65 to provide a distributive power system.

A portion of the expanded gases exiting gas motor 40, as secondary gases, are passed through line 47a into accumulator tank 39. The secondary gas exiting tank 39, at a pressure of from about 5 to 30 PSIA and a temperature of about 35° F. to 200° F., is sent to mixing tank 36 via line 47b and gas scrubber 45b to remove entrained moisture.

Alternatively, gases exiting gas motor 40 through line 47c, pass through condenser 76 to preheat ambient air introduced via line 49c. The preheated ambient air stream is in fluid communication with accumulator tank 39 via line 75. Exhaust gases may be exhausted through line 48 and gas scrubber 45a and become a part of the exhaust stream that is exhausted.

Generally when the gas motor powers a self propelled vehicle [not shown] substantial energy expended to drive said vehicle may be recovered by converting said gas motor 40 to a power driven generator by virtue of the momentum energy of said vehicle. This is accomplished by controller 56 and means to shut off power gases while opening ports [see FIG. 5] to admit ambient air 49b to be pressurized within gas motors 40, 73. The pressurized air is in fluid communication via line 74 with accumulator tank 39 or directly to tank 65 as a working fluid [not shown].

If desired, the ambient air can be charged into mixing tank 36 via line 49a instead of the recycled expanded gas [secondary gas] in line 47b. In any case, it is preferable to admix the combustion gases exiting the reactor 24 with a lower pressure and temperature secondary gas, such as the recycled expanded gas or ambient air, in a ratio by mass of about 3 parts to about 10 parts of secondary gas to about one part of the combustion gases. This forms a working fluid for expansion in the gas motors, and has several advantages. First, this provides a substantially improved thermal efficiency, because heat in the combustion gases is transferred to the secondary gases and is not lost to the environment. Further, by reducing the temperature and pressure of the working fluid sent to the gas motors via line 38, the cost of building and operating the gas motors is substantially reduced and the operating life is substantially extended. Moreover, mixing the combustion gases with the secondary gases increases the volume of the power gases or working fluid, which in turn enable the gas motors to produced the desired power output.

Because the mixing tank 36 and the reactor 24,25 and 26 [FIGS. 1 and 5] are thermally insulated, the combustion occurs under at least substantially adiabatic conditions and heat losses are substantially reduced, which increases the thermal efficiency of the system. If desired, the hot combustion gases exiting the reactor or reactors can be sent via lines 84 and 85 and eductor 37a, which will induct ambient air from line 49d, to form a mixture of gases, which in turn is sent to a space heating system 77, a distributive cooking system 78, a hot water system 79 and/or a clothes dry system 80. In each case, the combustion gases mixed with ambient air are expanded in gas motors 40a, 40b, 40c and 40d and provides the energy to drive the gas motors and the heat required for these systems.

FIG. 2 shows in detail the reactor 24 used in the embodiment of FIG. 5. The construction and operation of reactor 24 used in FIG. 5 is the same as described above with reference to FIG. 2.

Figure 5A:
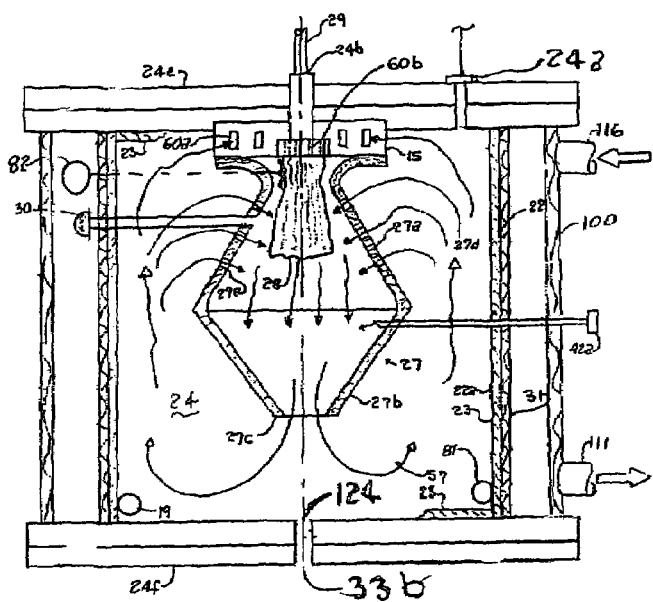
FIG. 5A is a detailed view, in section, of another embodiment of the invention.

FIG. 5A shows an alternate embodiment of the reactor 24, in which the outlet 33b is not controlled by a normally closed valve. Instead the orifice 124 is large enough to allow combustion gases to freely escape through outlet 33b, yet small enough to restrict such flow to maintain a substantially constant volume of combustion gases in reactor 24. The size of orifice 124 is empirically determined. Depending on the operation of the inlets 24a, 24b, [FIGS. 1 and 5] with or without the use of valve 59, the flow of products of combustion from the reactor 24 may be intermittent or continuous. The embodiment of FIG. 5A may be used in any of the embodiments described herein.

Figure 6:
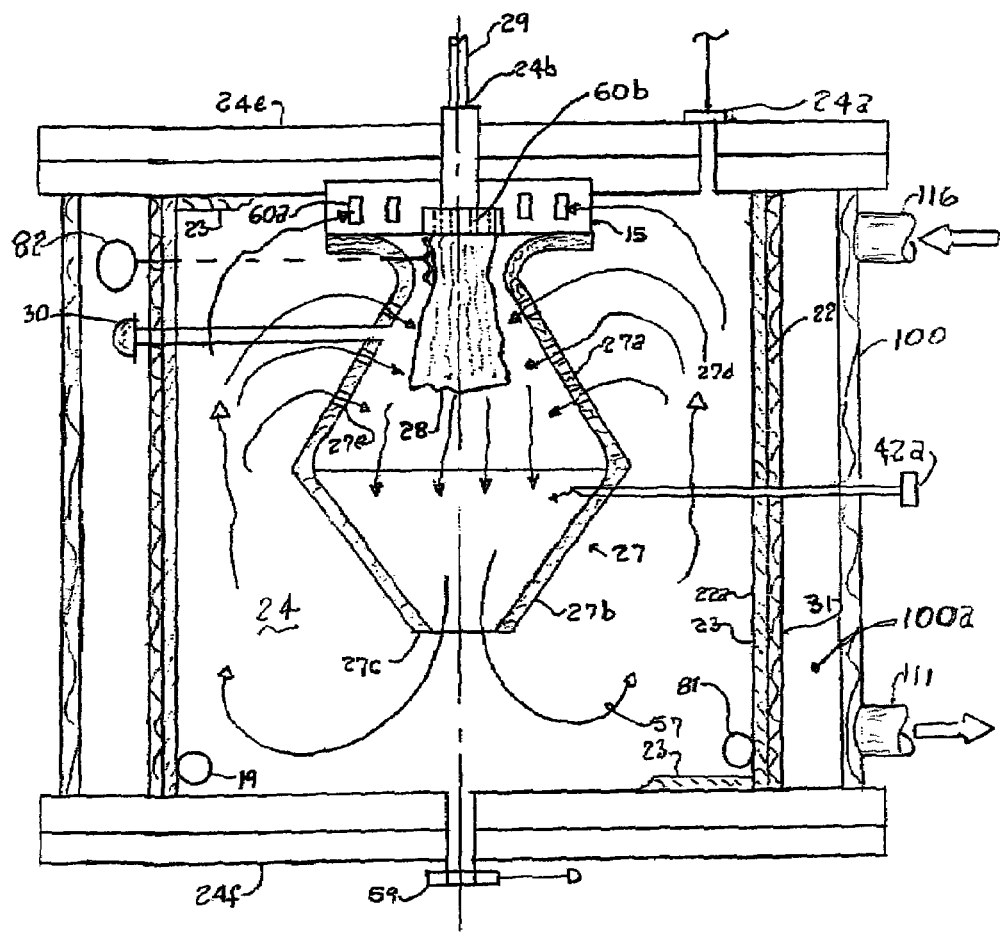
FIG. 6 is a detailed view, in section, of the gas reactor of FIG. 3 equipped with an external shell and heat exchanger.

FIG. 6 shows another embodiment of the invention in which the reactor 24 includes an external shell or shroud 100 surrounding the outer wall 22 to form a heat exchanger chamber 100a extending longitudinally of the reactor. Suitable heat exchanger inlet 116 and outlet 111 enable the introduction of a heat exchange gas, such as compressed air, into and through the chamber 100a to cool the external wall 22 of the reactor 24. The heat absorbed from the wall 22 of the reactor 24 is transferred to the secondary gas system as described below with respect to FIG. 7. Retaining this potentially lost heat within the system is a part of the adiabatic power generating system. Further, it is advantageous to transfer some heat from the reactor wall to prevent overheating the wall.

FIG. 7 shows a reactor 24 of the type illustrated in FIG. 6 used in a process employing some of the features of FIG. 1. Like reference numerals in the Figures denote like items. High temperature and pressure combustion products gases exit reactor 24 at about 2400° F. and 1200 PSIA through outlet 24d and are passed into insulated collector tank 200 via line 201, valve 59 and line 202. Air at 60° F. and 400 PSIA is used as a heat exchange gas and is supplied to heat exchange passage 100a of reactor 24 by blower 209, line 209a and inlet 116. The heat-exchange gas passing through passage 100a carries heat away from and cools reactor 24. The heated heat-exchange gas exiting passage 100a is at about 400° F. and 400 PSIA.

The combustion products collected in tank 200, with external insulation 31 and internal insulation 23, are conveyed to mixer 220, where they are mixed with air and/or expanded gas recycled from gas motor 40 as described below. Mixer 220 thus forms a mixture of combustion products at elevated temperature and pressure with a "secondary gas" at a lower temperature and pressure comprising air or expanded gas recycled from the work producing zone [such as gas motor 40] or a mixture of air and the recycled expanded gas.

In particular, mixer 220 comprises an outer shell or shroud 221 surrounding an inner mixing chamber 222 to form an inner chamber 223 there between. Combustion products flow from collector tank 200 through conduit 213, regulator 214 and conduit 215 into tangential inlet 224 of mixer 220 to spin the high pressure and temperature combustion products. The spinning combustion gases are directed through swirl vanes 225 to mix the gases.

A secondary gas in the form in the form of air at 60° F. and 15 PSIA may be introduced into mixer 220 through line 226 and blower 227 when regulator 228 opens to connect line 226 to blower 227. A secondary gas in the form of expanded gas recycled from tank 39 at 140° F. and 20 PSIA may also or alternatively be introduced into mixer 220 through line 47b and blower 227 at about 400 PSIA when regulator 228 opens to connect line 47b to blower 227. Blower 227 feeds the secondary gas via lines 227a and 227b into the mixing chamber 223. The secondary gas partially mixes with the hot combustion products at the junction 229 of the converging portion 230 and diverging portion 231. The partially mixed gases flow through perforated section 232 and these higher pressure gases escape through perforations 233 into the flow of secondary gas in the mixing chamber 223. The mixture of gases exiting the mixer 220 via outlet line 234, with back flow prevention valve [not shown], is thus at a lower temperature and pressure, 600° F. and 400 PSIA, than the temperature and pressure of the combustion gases produced by reactor 24.

In addition, the gases at 400° F. and 400 PSIA exiting the heat exchanger passage 100a of reactor 24 are also sent to tank 65 via outlet 111 and line 101. Working fluid for gas motor 40 is supplied on demand through line 265, controller 266 and straightening vanes 267. The gas motor 40 expands the gases and the work produced is collected via line 72 in a conventional manner. Expanded gases are sent via line 47a to tank 39 from which they can be recycled to mixer 220 via line 47b. Cool expanded gases may be sent by lines 47a and 268 via controller 269 to air conditioning zone 270 where in-space cooling is accomplished.

When desired, expanded gases stored in tank 39 may be released to the atmosphere via line 271 and valve 272.

The use of reactors 24, 25 and 26 are described with respect to FIGS. 1–7 in the context of providing larger amounts of power. When smaller amounts of power are to be produced, the temperature, pressure and flow of the combustion product gases may be lower than as described herein and will be empirically determined. Thus, the present invention is useful over any range of scale.

Figure 8:
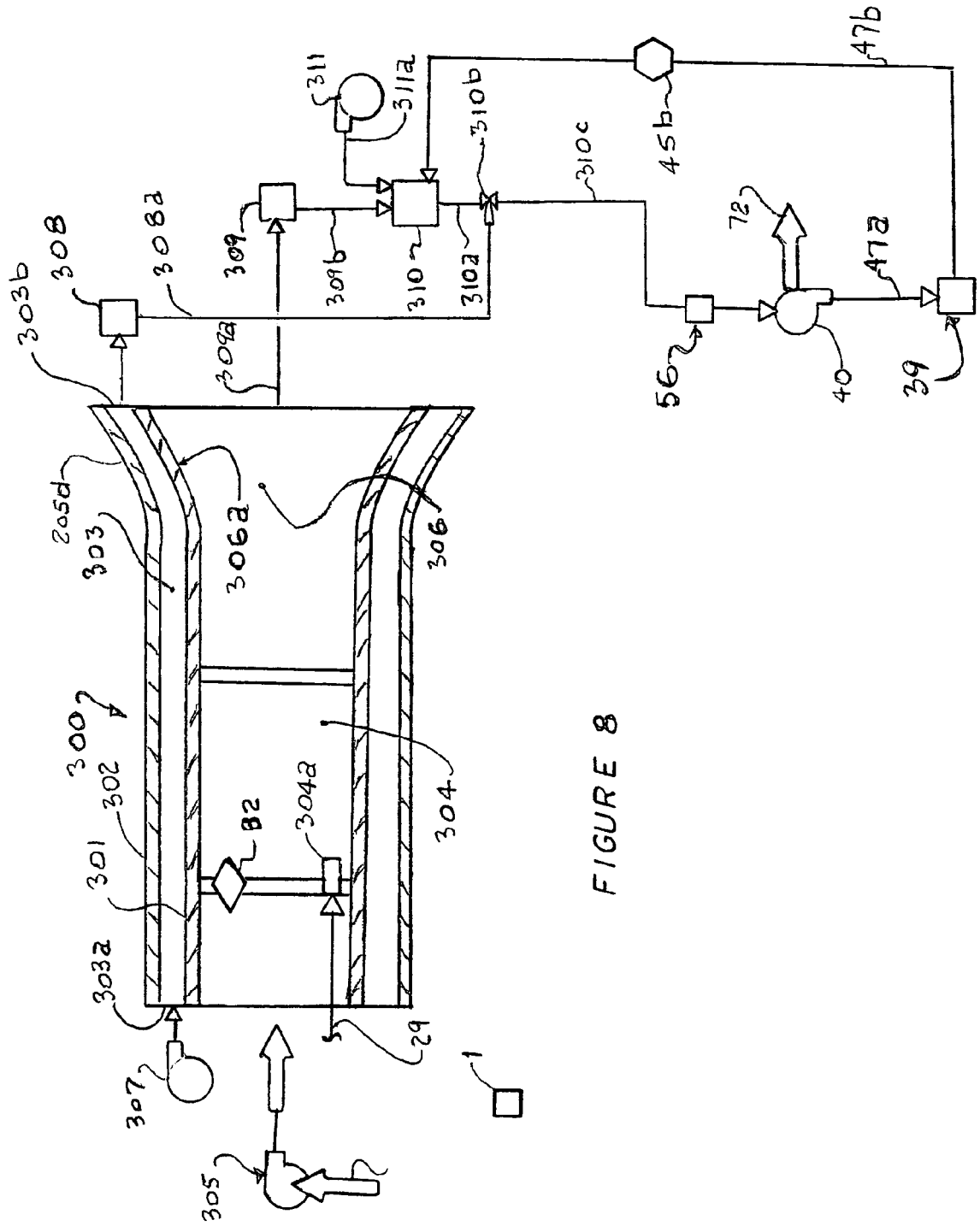
FIG. 8 is a schematic view of another embodiment of the invention.

With reference to FIG. 8, the combustor assembly 300 comprises an inner housing 301 surrounded by an outer shell or housing 302 to form heat exchange passage 303 having opposed inlet 303a and outlet 303b. Outer housing 302 is thermally insulated to reduce heat losses from inner housing 301. Inside housing 301 is mounted a burner or combusting device 304 provided with a fuel inlet 304a and igniter 82. Fuel is supplied to burner 304 via fuel inlet 304a and line 29 from a fuel source [not shown]. Compressed air flows from compressor 305 into the burner 304 in stoichiometric excess. Once ignited by igniter 82, under control of computer 1, the mixture of fuel and compressed air burns and the hot combustion product gases, at about 1500° F. at 800 PSIA, preferably passes through diff-user 306. Diffuser 306 has a diverging wall 306a so that hot combustion product gases will decelerate as they pass through and exit diffuser 306.

Air supplied by blower 307 at 60° F. at 400 PSIA flows through inlet 303a into heat exchange passage 303 and then exits at about 450° F. at 400 PSIA via outlet 303b. This will cool the combusting device 304 and the diffuser 306. The heated air is collected in buffer tank 308.

The hot combustion product gases exiting diffuser 306 at about 1500° F. and 800 PSIA flow to buffer tank 309 via line 309a including back flow prevention valve [not shown]. Where the residence time in combusting device 304 is sufficiently long to effect complete combustion of the fuel in the combustible mixture of fuel and air, as it is in the case of reactors 24, 25, 26, then the buffer tank 309 need merely be of a size sufficient to hold a desired amount of the combustion gases. However, where the residence time is too short to effect complete combustion in burner 304, then combustion will continue in buffer tank 309. An after-burner [not shown] may also be provided in buffer tank 309, such as methane afterburner, to aid in completing combustion of the combustible mixture.

Under control of computer 1, the hot combustion product gas is conducted to mixer 310 via line 309b. Also charged to the mixer 310 is air at 60° F. and 400 PSIA as secondary gas, which is supplied by blower 311 via line 311a. The hot combustion gases are mixed with the secondary gas in mixer 310 to form a mixture of power gas, or working fluid, at a temperature of 300° F. to 600° F. and pressure 200 to 400 PSIA. Mixing tank 310 may be any suitable device, such as mixing tank 36 and eductor 37b [FIG. 1] or mixer 220 [FIG. 7].

The working fluid is then sent to controller 56 via line 310a, valve 310b and line 310c. From controller 56, the working fluid is sent to gas motor 40. Gas motor 40 operates as explained above with reference to FIG. 1 to expand the gases charged therein, and the work produced is collected via line 72 in a conventional manner. A portion of the expanded gases exiting gas motor 40, as secondary gases, may be passed through the line 47a into accumulator tank

39, at a pressure of from 5 to 20 PSIA and a temperature of about 35° F. to 120° F., and may then be sent to mixer 310 via line 47b and gas scrubber 45b to remove entrained moisture.

The heated heat-exchange gas may be used as part of the working fluid for gas motor 40, by sending the heated heat-exchange gas in buffer tank 308 via line 308a to valve 310b. Valve 310b can connect line 308a to line 310c when it is desired to do so.

As can be seen, the system shown in FIG. 8 operates at substantially adiabatic conditions because heat losses are minimized by recovering heat from burner 304 by means of the heat-exchange gas and using the heated heat-exchange gas as part of the working fluid for gas motor 40, and also by recycled expanded gas from tank 39 as part of the working fluid for gas motor 40.

Burner 304 may be any device that will combust a combustible mixture of fuel and oxygen-containing gas to produce gaseous combustion products. Burner 304 will be designed to provide combustion product gases of the desired temperature and pressure and mass suitable for the scale of the desired power output of the expander 40. For generation of larger amounts of power, the combustion products are suitably at a temperature of from about 1200° F. to 3000° F. and at a pressure of from about 400 PSIA to about 2000 PSIA. Suitable combusting devices include gasoline, diesel or other hydrocarbon fuel-powered internal combustion engines that are employed simply to provide an exhaust gas comprising the gaseous combustion products referred to above. In such cases, the crankshaft of the internal combustion engine will be disconnected from any load. Or the combusting device may simply be a conventional burner capable of producing combustion products at the desired temperature and pressure.

The said internal combustion engine and other combustors of this invention collect unused heat with input to mixer 310 or directly stored in tank 65 [not shown] as a portion of the working fluid.

Some of the most relevant applications of the embodiments of FIGS. 1–8, are listed herein:

- With reduced flows of the working fluid, small scale applications open up the potential to operate portable electrical power systems and also cool electronic components. Chemicals that have exothermic reactions can also be used as a source of heat. Further small scale machinery can provide benefits of prototype testing and direct small scale applications.
- Capture lost energy by producing said working fluid by regeneration of energy where momentum is normally wasted during the normal operation of the mechanical systems.
- Aircraft and spacecraft using said working fluid for propulsion, maneuvering and operational stability.
- Alternative fuels industry to supply the demand of systems using this invention.
- Construction equipment using said working fluid with multiple turbines to operate remote devices as shovels and lifting devices as cranes.
- Cooling systems, wherein, expanding said work fluid to reduced pressures at temperatures below the ambient surrounding. Space comfort temperatures can be maintained for lower cost than the conventional mechanical refrigeration cycle.
- Trucks and automobiles can be operated by expanding said working fluid for propulsion maneuverability and operational stability. Without the requirement for pavement traction forces, tires and running gear will be greatly simplified. Less skidding on ice and controlled vehicle stability. Reverse thrust may be used for emergency braking and reduce the destruction of impending collisions.
- An energy internet, akin to a computer internet, can be used to provide high pressure and temperature gases in primary mains with many branches with reducing pressures to provide energy for a city or community. In a similar manner electrical power is distributed in a high voltage primary loop with some steps of reduced voltages to secondary branches. Said working fluids operate large loads in place of large electrical motors. This could result in minimal electrical service to buildings for lighting and communications only.
- Guns and ordinance can be operated using extreme high pressure and temperature gases with conventional fuels. This will obviate the storage of magazines of explosives on board military and other similar devices.
- Relatively large volumes of secondary air mixed with high temperature and pressure gas can provide very light and quiet leaf blowers, lawn mowers and small landscaping machines.
- Strap on package operating with said working fluid for vertical lift and propulsion, can be used to operate man lifts [person lifts] for military, fire fighting and other similar uses.
- Military applications using said working fluid, such as stealth tanks with low heat signature and noise. Higher top speeds and longer range.
- NASCAR applications with the working fluid providing more power in a lighter and more compact unit.
- Snow mobiles, like automobiles, can be operated by expanding said working fluid for propulsion, maneuverability and stability.
- Trains can be powered by the said working fluid. Locomotives will no longer be required while each car can easily be packaged with a self sufficient power plant. A command car can control ail coupled cars. Trains can be of any length and reduce stopping distance with regenerative braking.
- All self-propelled vehicles can use said working fluid to operate as a "hovercraft" with gas power propulsion and maneuvering.
- Marine craft can use said working fluid for propulsion, maneuvering and stability.

The wind turbine systems of the invention are illustrated in FIGS. 9A, 9B and 10. These systems use wind energy or solar energy alone or in combination to generate electrical power or other forms of useful work.

Wind turbines are generally placed on tall towers to capture wind energy in a zone where the air velocity is higher. For best results, the wind turbine systems use the best state of the art in wind machines.

Wind energy is not able to be captured during periods when the wind velocity is very low. Every wind turbine has a cut-in speed depending on the torque required to start the blades moving. This start-up torque depends on the mass and resistance coupled to the turbine shaft. Turbine blades are usually of very large diameter to increase the area of the wind flux. Turbine tip speed velocities must be reduced to prevent undue high velocities approaching super-sonic velocities. The turbine tip speed is a product of the blade rotational speed and turbine diameter. This phenomenon requires using reduced rotational blades speeds. The turbine shaft is required to turn electrical generators that must spin at synchronous speeds for producing AC power at 60 cycles per minute or to meet requirements of DC generators. In order to convert low turbine speeds to high speed generator shaft rotation, very heavy transmissions are required. This massive equipment is installed high above the ground. The transmission and coupled generators have considerable weight and require regular inspection and maintenance. By installing the generator on the ground and reducing the size or eliminating the transmission and only coupling the air compressor to the wind turbine shaft, the present invention will reduce initial fabrication costs and lower operating costs, enabling the production of electricity at lower costs than the competition. Further, the wind turbine system is designed to produce electrical power continuously even if wind energy is not available by using standby compressors. In addition, the present invention will use air compressors requiring lower cut-in wind turbine speeds because compressors are equipped with controls and mechanisms to unload the compression load and provide just enough back pressure to turn the turbine blades based on wind energy available. Compressors also have means to inject water. Operating at low cut-in speeds will enable the systems of the present invention to utilize a larger portion of wind energy available at the site. Air compressors are suitable to operate at low speed with larger displacement. Air compressors operating in stages may operate in series powered on the same shaft with mechanisms and controls to load individual cylinders or stages in sequence to match power available at the turbine. Optimum selection of said compressors and wind turbine blades require turbine shaft speeds to match compressor requirements without a transmission. Simple low cost and lighter weight power transfer devices as belt-drive, chain-drive is perhaps preferable in applications requiring high compressor speeds. In any case, the said compressors can operate effectively at varying turbine speeds Compressed air can be stored in a buffer tank and directly expanded in turbines. Water is also injected in the air compressors to promote isothermal compression because the evaporation of water absorbs the heat of compression. The entrained water becomes, as a vapor, becomes a part of the working fluid.

With reference to FIGS. 9A and 9B, the hybrid wind energy and thermal power system of the invention comprises equipment housed in building 320 separate and apart from the compressors 8a and 8b. The air compressors 8a and 8b are mounted on an elevated tower 321 on ground 159 and are provided with known mechanisms [not shown] to unload during the event of low wind velocity so that blades 322 powered by wind flux 323 produce a torque on the blades with low as possible cut-in speed. Blades 322 are mechanically linked to compressors 8a and 8b by means of a belt-type drive 138. Compressed air from compressor 8b is transferred to buffer tank 324 through heat exchanger 50a to cooler air. Tank 324 stores low pressure air, as generated by compressor 8b at low turbine speeds. Low pressure air in tank 324 is passed into the high pressure stage of the air compressor 8a. Air coming from compressor 8a is cooled in heat exchanger 50b and stored in buffer tank 325.

When the blades 322 are stationary or are turning below the cut-in speed, self-powered standby air compressors 8c and 8d are turned ON by a relay device [not shown] to supply compressed air to tank 325. Compressors 8c and 8d are likewise turned OFF when the blades 322 are turning at a speed at or above the cut-in speed.

Tank 325 supplies reactors 24a, 24b, 24c with compressed air via line 53, while fuel is supplied to the reactors by fuel supply line 29. Reactors 24a, 24b, 24c are operated as described above with respect to FIGS. 1 and 2 to produce a continuous supply of high pressure, high temperature combustion products, which are sent to buffer tank 200 via line 33 and thence to mixer 310. Mixing tank 310 may be any suitable device, such as a mixing tank 36 and eductor 37b [FIG. 1] or mixer 220 [FIG. 7].

Secondary gas at a lower pressure and temperature, such as ambient air or compressed air, is charged into mixer 310 via line 321 and mixed with the high temperature and pressure combustion products to form a working fluid for expanders 40, as described above. Preferably, expanders 40 are gas motors.

The working fluid is sent via conduit 322 to tank 65 and from there through controller 56 and then to expanders 40 via conduit 323. Expanders 40 produce work by expanding the working fluid and thus operate electrical generators 131 to produce power to an electrical grid. At least a portion of the expanded working fluid is sent from expanders 40 to buffer tank 39 and then, via line 47a, to mixer 310. All of the above-described are operating under control of computer 1.

Referring to FIG. 10, wind powered compressors 8a, 8b are mounted on tower 321 and are powered by wind flux acting on blades 322 [as described above]. Compressed air from low pressure stage compressor 8b is sent to high pressure stage compressor 8a. The high pressure air thus obtained is sent by conduit 330 to tank 325, and thence by conduit 53 to each of the reactors 24a, 24b, 24c stored below ground level 159.

Solar energy flux 331 obtained from the sun 332 is focused onto solar energy receiver 333 by reflector 334. Receiver 333 will rise in temperature from the focused solar energy flux 335. The heated receiver 333 is in heat-exchange relationship with heat-exchanger 336, and heat-exchange fluid delivered to heat-exchanger 336 via conduit 338 will carry heat transferred to the fluid via conduit 338 to the heat exchanger 340 inside each reactor 24a, 24b, 24c to heat the air or compressed air in the reactors. Said heat transfer means comprise a mechanical device [not shown] to transfer said heat-exchange media from the source at 336 to reactor heater at 340. Said media is return conduit means 339 to heat-exchange means 336. Conduit means 338 and 339 are suitably insulated for minimum heat losses and may be painted black to absorb incident solar energy to off-set heat losses.

The reactors 24a, 24b, 24c are charged with a suitable fuel from a fuel source [not shown] via line 29 to form with the charge of compressed air, a combustible gaseous mixture. The combustible gaseous mixture is ignited by igniter 82 under control of computer 1 to form high pressure, high temperature combustion products, as described above in FIGS. 1 and 2, which are processed to produce work as described above with respect to FIGS. 9A and 9B. In particular, the gaseous combustion products are sent via line 33, suitably insulated, to buffer tank 200 located in building 320. [Building 320 is shown rotated 90° and in plan to facilitate viewing of the equipment therein]. The high temperature, high pressure combustion products are sent from buffer tank 200 to mixer 310. Secondary gas at a lower pressure and temperature, such as ambient air or compressed air, is charged into mixer 310 via line 321 and mixed with the high temperature and pressure combustion products to form a working fluid for expanders 40, as described above. Preferably, expanders 40 are gas motors.

The working fluid is sent via conduit 311 to tank 65 and from there to expanders 40 via conduit 312. Expanders 40 produce work by expanding the working fluid and thus operate electrical generators 131 to produce power to an electrical grid. At least a portion of the expanded working fluid is sent from expanders 40 via line 47a to buffer tank 39 and then, via line 47b, to mixer 310. All of the above-described operations are under control of computer 1.

As in the case of FIGS. 9A and 9B, when the blades 322 are stationary or are turning below the cut-in speed, self-powered standby air compressors 8c and 8d are turned ON by a relay device [not shown] to supply compressed air to tank 325. Compressors 8c, 8d are likewise turned OFF when the blades 322 are spinning at or above the cut-in speed.

During the night or on cloudy days, the solar energy will not enable the heat-exchangers 336 and 340 to heat the compressed air charged to the reactors 24a, 24b, 24c, but combustion of the combustible mixture will occur nevertheless, although perhaps less efficiently, to produce high pressure, high temperature gases sent to buffer tank 200. However, where the solar energy is high, there will be periods when the compressed air inside reactors 24a, 24b, 24c will be heated by heat exchanger 340 to provide an increase in temperature and pressure of the compressed air sufficient to eliminate the need for combustion. In such cases, fuel will not be supplied to the reactors and the high pressure, high temperature air obtained without combustion is sent directly to tank 200. In such circumstances, the thus heated air itself may constitute the working fluid for the expanders 40 and can be sent directly from tank 200 to tank 65 [not shown] without the need to be mixed with a secondary gas in mixer 310.

The systems described in FIGS. 9A, 9B and 10 can develop large scale power generation from any combination of using a bio-fuel, wind energy and solar energy. Such power plants can displace large scale use of petroleum fuels and take off the pressure to install nuclear power plants. The environmental benefits are essential at this time with a growing world population and an ever increasing demand for fossil fuels. Atmospheric pollution and imbalance of Carbon systems are leading the world to face consequences for Global Warming and health problems for all mankind. These systems of the invention, when implemented, will contribute to solutions to these problems.

The reactors 24a, 24b, 24c can be designed in any suitable configuration best suited for the siting of the power plant. Preferably the reactors are fabricated with materials best suited for high fluid pressures and containing large volumes. Energy developed and potential energy stored is based on the product of the pressure and volume. Very large amounts of energy can be obtained from nature, substantially from solar energy, at little or no fuel cost and sited to supply large regions, such as the South-Western United States, with a major portion of electrical demand with minimal environmental impact.

By placing the reactors underground, the reactor vessels will be able to withstand high pressures due to superincumbent earth pressures and the backfill materials and under ground soil become natural insulation. The reactors can be buried at depths to withstand high pressures. Further, back fill materials shall be processed to optimize pressure transfer, such as sand with rocks, organic materials and all debris removed. The pressure profile should approximate fluid pressures that are a function of depth. More so the backfill material can be mixed with insulation materials, as vermiculite, to minimize heat losses. Reactor structures can be fabricated from corrosion resistant steel [may require cathodic protection] or pre-stressed reinforced concrete. Pressure relief valves and back flow prevention valves shall be provided in conduit means and at all pressure vessels for safety and process requirements.

Computer software analysis is a preferred tool for designing systems to utilize the maximum wind and solar energy available. Also pressures selected are based on the initial air pressure before heat is introduced in to the reactor by heat exchange means or by combustion. The final pressure in a constant volume process is the product of the ratio of absolute temperatures and the initial pressure. Higher initial pressures in the reactors will yield larger final pressures to be blended with secondary gases to produce working fluid.

Figure 11:
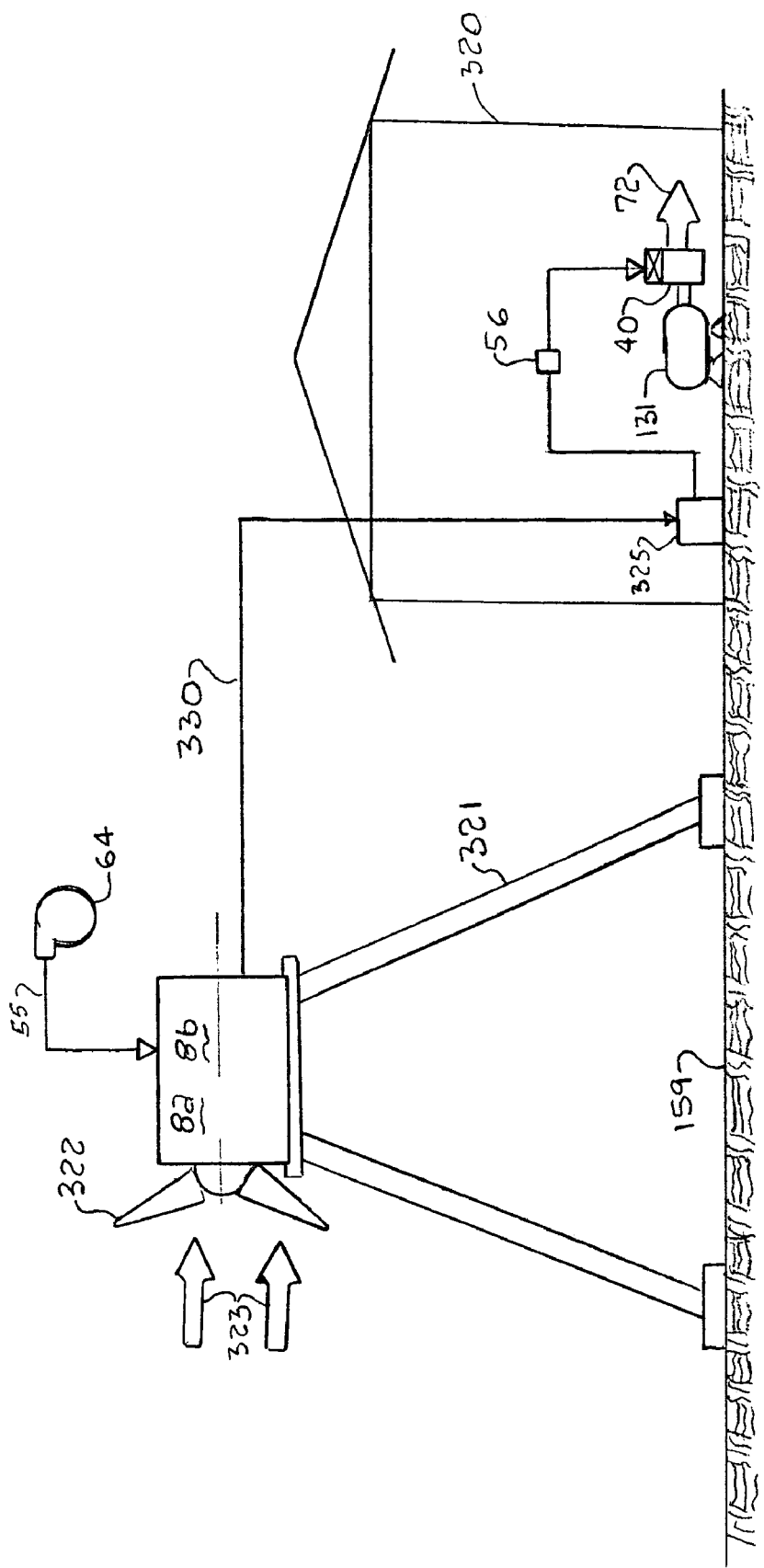
FIG. 11 is a schematic view of a wind turbine with compressed air working fluid.

In FIG. 11 wind flux 323 energizes blades 322 to operate compressors 8a and 8b. Water is injected into compressor via line 55 from water pump 64. Compressed air is charged into buffer tank 325 via conduit 330. Controller 56 regulates air flow into expander turbine 40 that drives generator 131 to produce energy 72.

ADDITIONAL ADVANTAGES

This invention is suitable to use many gaseous and liquid fuels with similar output per million BTU. Fuel flow rate depends on heating value of the fuel. It is suitable for continuous operation with Ethanol containing a significant amount of water. This means that the cost of large-scale manufacture of Ethanol is economical and is competitive to market clearing price per million BTU. Ethanol can be produced as an agricultural product with solar energy as the source of power. A fully developed Ethanol industry will generate many local jobs and transfer energy revenue from Arab countries to the US economy. Also converting from gasoline to compressed gas fuels and bio-fuels will favorably modify the US and Global oil economy.

Present art internal combustion engines can be converted to operate on the thermodynamic cycle of this invention by removing some components and adding some with a very favorable operational payback.

Present art gas turbine engines and jet engines can be adapted to operate on the thermodynamic cycle of this invention with a very favorable payback.

Solar systems are capital intensive and require large areas of land. This invention works well when used in combination with concentrator type of solar collectors wherein solar energy may independently operate the gas reactor as discussed with respect to FIG. 10 or when the sun is not providing the energy needed, the reactor utilizes the extent of solar energy available and thereby the system becomes cost effective. Further if reactors are placed under ground parasitic heat losses are prevented to enhanced thermal performance.

Natural gas is presently piped in a national network. A national infrastructure for dispensing stations can be developed in a very short time and for a low cost.

Present automotive engines produce substantial pollution and consume more fuel at traffic gridlock episodes and at "stops" during transit where engines are operating at part load and low efficiency. This engine of the invention can be shut off at stops and traffic-jam episodes while stored power gases drive the vehicle at low loads. Atmospheric emissions during traffic congestion is substantially less and alleviates pollution in crowded cities, for instance Mexico City and many cities in the Third World.

This engine of this invention operates at optimum efficiency at all loads.

The gas motors of this invention operate at temperatures of 200 to 1000° F. depending on the fuel and load characteristics. The cost of fabricating suitable gas motors is significantly less than the turbines designed for high temperature operation. The gas motors of this invention are lighter and easier to operate and control.

The gas motors of this invention operation characteristics, specifically when torque is compared with speed, are suited for automotive applications. In fact, gas motors operated in parallel or series function as torque converters with maximum torque at zero speed and progressively lower torque with increasing speeds. The power output is leveled with a constant product of torque and speed. Many vehicles can be successfully operated without transmissions.

The parasitic power for compressing air is higher for the state of the art engines. Gas turbines require about 67% power to operate the air compressor and about 30% is required to operate the air compressors for internal combustion engines. For this invention about 16% power is used to operate the air compressors and much of this energy is recovered in reversible cycles. Also most state of the art gas turbines are directly coupled to the air compressor and deteriorate performance with varying turbine speed that directly affect compressor efficiency. This invention uses compressed air in a uniform mode and air compressor efficiency is independent of external loads.

For this invention the formation of Hydrocarbons and Carbon Monoxide is detectable traces approaching zero. Controlled flame and products of combustion temperatures produce very low concentrations of Oxides of Nitrogen. Gaseous and atomized liquid fuels burn completely and no particulate emissions are expected.

Power systems can be designed as distributive power systems with rotary or reciprocating gas motors. The applications for such systems are numerous, for instance, trains can be designed with each car self powered so the train can operate without locomotives with connections for power gas from a central source or within the car. During braking or deceleration the multitude of said gas motors regenerate power. The energy recovery will improve the overall efficiency. Since turbines coupled to a multitude of axles absorb the momentum energy the stopping distance of the train will be significantly reduced to a range that is within the visual range of the operator and significantly reduces at grade crossings accidents. The working fluid is power gases with higher efficiencies than electrical systems that require irreversible processes and additional weight of motors and generators.

EPA has promulgated the concentrations and mass emissions of $NO_x$ considered as a pollutant and to contribute to Global Warming. The production of the gas is dependent on flame temperature that can be easily regulated based on the application so that $NO_x$ emissions approach zero.

In typical vehicles, during very low speeds and during the deceleration the flow of reactor elevated temperature gases stops. The secondary gases are only used. On a time basis the use of combustion gases is much less than the state of the art and average atmospheric emissions are less.

With a more efficient and quiet power plant installed for lower capital costs, distributed power generation systems will provide immense economic advantages and alleviate loading of local, regional and national electrical grids and also the impact of rolling blackouts or brown outs. The utility, by law, pays back at current rates to the client for electrical energy generated at the local site and returned to the power grid. High rise buildings, for instance, can generate power continuously with revenue, particularly during off-hours, that will amortize the investment and operating costs. The cost of locally generated electrical power is much lower. Power generated by utilities is not efficient due to additional energy losses for voltage transformation at the generating side, long distance transmission line grids, voltage transformation at the supply end and distribution losses at the supply end. The net efficiency of electrical power from the grid is about 30% compared to about 80% for onsite power. Farther this significant gain in efficiency for utilization of said electrical power substantially reduces atmospheric pollutants and Global Warming gas issued into the atmosphere.

The efficiency of this invention engine is not affect by altitude above sea level.

Catalytic converters or other devices are not expected to be required to process exhaust gases to comply with legal emissions requirements.

This invention engine is quiet during operation and does not require any sound attenuation devices.

Piston engine has about 70.7% of axial force of expansion with sideways thrust and associated problems. Rotary gas motors and double acting reciprocating pistons do not have this problem.

Piston engines with instantaneous explosions have a mean effective pressure about 50% of maximum pressure. This invention produces continuous maximum power based on the design of the expansion device.

Ethanol conversion reduces evaporative hydrocarbon emissions during fueling of vehicles.

Reactor gases when distributed from a central source provide enhanced thermal efficiency and economic efficiency for appliances such as space heating, hot water heating, gas cooking and clothes drying. Utility Electrical energy is about 35% efficient at the point of use. Conversion to gas operation on a large scale is beneficial to the environment.

The invention claimed is:

1. An adiabatic power generating system, comprising:
   means for combusting a combustible mixture of a fuel and an oxygen-containing gas to form gaseous combustion products at a predetermined first range of elevated temperature and pressure;
   means for conducting the gaseous combustion products to a thermally insulated mixing device downstream of the means for combusting;
   means for introducing into the thermally insulated mixing device a secondary gas at a second range of temperature and pressure lower than the first range to form in the thermally insulated mixing device an admixture of gases as a working fluid at a third range of temperature and pressure intermediate the first and second ranges; and
   means for conducting the working fluid to a work-producing device operable to produce work by expansion of the working fluid; wherein
   the means for combusting is adapted to minimize heat losses from the system and allow the system to operate at least substantially adiabatically, and comprises one of a housing and a first heat exchange device in heat exchange relationship with the housing, operable to transfer heat from the means for combusting to heat the secondary gas and to conduct at least a portion of the heated secondary gas as working fluid to the work-producing device for expansion therein and (ii) a thermally insulated gas reactor having a substantially constant volume.

2. The system of claim 1 wherein the means for combusting comprises:
   at least one gas reactor having an elongated, substantially sealed housing having a substantially constant volume, inlets and outlets at opposite ends thereof, a combusting device and means for propagating a modulated flame within the housing;

a first conduit communicating with the inlets for feeding a pressurized oxygen-containing gas and a combustible fuel to the interior of the reactor to form a combustible mixture therein; and a second conduit communicating with the outlets for exhausting gaseous combustion products from the reactor at the first predetermined range of elevated temperature and pressure; wherein the thermally insulated mixing device is positioned between the gas reactor and the work-producing device.

3. The apparatus of claim 2, wherein there is a single reactor.

4. The system of claim 2, wherein the secondary gas is at least one of ambient air, compressed air, preheated ambient air and preheated compressed air.

5. The system of claim 2, further comprising means for recovering at least a portion of the expanded gases and feeding the recovered portion as the secondary gas to the thermally insulated mixing device.

6. The system of claim 2, further comprising:

a buffer tank having an afterburner, an inlet and an outlet;

a third conduit configured to communicate with the inlet for feeding gaseous combustion products and a remainder of the combustible mixture to substantially complete a combustion of the combustible mixer; and a fourth conduit configured to communicate with the outlet for exhausting the gaseous combustion products from the buffer tank at the first predetermined range of elevated temperature and pressure; wherein the buffer tank is positioned between the gas reactor and the mixing device.

7. The system of claim 1 wherein the means for combusting includes the thermally insulated gas reactor, the gas reactor comprising:

a first end having at least one inlet;

a second end, having an orifice and at least one outlet, the second end substantially opposing the first;

a housing interposed between the first and second ends and having a substantially constant volume; and a centrally placed elongated flame retaining chamber within the housing and in communication with the gas reactor inlets, the flame retaining chamber having a flame regulation structure comprising combustion air inlets and fuel outflow nozzles, each of relatively large cross-sectional area and arranged symmetrically with respect to the longitudinal axis of the chamber to provide symmetrical flame propagation longitudinally into the flame retaining chamber, the flame retaining chamber having a diverging portion adjacent the first end and the flame, including perforations for easy passage of local circulating products of combustion from an annulus space between an inner wall of the housing and an outer surface of the flame retaining chamber, while just downstream of the flame the flame retaining chamber converges and terminates in an ejection nozzle, whereby the combustion products strike the second end of the reactor and by internal forces the combustion products are transferred to the first end of the reactor and thence through the perforations in the diverging section of the flame retaining chamber and through the combustion air inlets.

8. The system of claim 1, further comprising:

means for compressing the oxygen-containing gas to a predetermined pressure before the oxygen-containing gas enters the means for combusting;

means for altering a temperature of the oxygen-containing gas to a predetermined temperature before the oxygen-containing gas enters the means for combusting; and means for feeding the compressed oxygen-containing gas to the means for combusting.

9. The system of claim 8 wherein the means for altering the temperature of the oxygen-containing gas comprises:

a second heat exchange device operable to transfer heat to and preheat the oxygen-containing gas before the fuel enters the means for combusting;

a solar-energy concentrator-collector device operable to convert solar-energy to collect heat; and means for transferring the collected heat from the solar-energy concentrator-collector device to the second heat-exchange device.

10. The system of claim 9 further comprising:

means for stopping the feeding of fuel to the means for combusting upon detecting a predetermined quantity of solar energy collected by the solar-energy concentrator-collector device; and means for conducting the heated and compressed oxygen-containing gas as the working fluid to the work producing device.

11. The system of claim 10 wherein the means for combusting is substantially insulated.

12. The system of claim 8, wherein the means for compressing the oxygen-containing gas comprises at least one wind turbine device and at least one gas compressing device, the wind turbine device configured to operate the gas compressing device.

13. The apparatus of claim 12, wherein there is provided solar energy collecting means to receive solar energy and to become heated thereby, first heat-exchange means in heat-exchange relationship with said solar energy collecting means for transferring heat from said heated solar energy collecting means to a heat exchanger fluid, and second heat-exchange means being operably related to said combustion means to transfer heat from heated heat-exchange fluid to compressed air in said combustion chamber.

14. The system of claim 12 wherein the gas compressing device is normally in an OFF standby state and is operable to enter an ON operable state at least when the wind turbine device is not turning or is below a predetermined cut-in speed.

15. The system of claim 12 wherein the at least one wind turbine device is configured to unload the gas compressing device during low wind velocity.

16. The system of claim 12 wherein the wind turbine device and the gas compressing device are mounted on a structure separate from a structure supporting a remainder of the system.

17. The system of claim 1 wherein the work producing device comprises one or more rotary gas motors arranged in a configuration suitable to load conditions, the gas motors being operated by the working fluid at the third predetermined range of temperature and pressure.

18. The system of claim 17 wherein:

the rotary gas motors comprise one or more turbines each having an output shaft, and means for regulating and automating controls of the turbines such that the output shaft torque is suitably matched to self-propelled vehicles operating load characteristics; and the turbines are mechanically coupled in at least one of series and parallel to loads to perform as torque converters.

19. The system of claim 1 wherein the work-producing device is operably connected to and powers an energy consuming device selected from the group consisting of a distributive cooking device, a hot water heating device and a clothes drying device, and the means for conducting the working fluid to the work producing device is operable to feed a portion of the admixture to the work-producing device and a portion to the energy consuming device to provide heat therein.

20. The system of claim 1 wherein the system is portable.

21. The system of claim 1 wherein the means for combusting comprises a lining of high temperature refractory gas reactor having a substantially constant volume to minimize heat losses from the system and allow the system to operate at least substantially adiabatically.

22. The system of claim 1 further comprising means for routing the working fluid from the work producing device to at least one of a refrigeration and an air-conditioning system, wherein the work producing device is operable to expand the working fluid and reduce the temperature of the working fluid below an ambient temperature.

23. The system of claim 1 wherein the means for combusting is enclosed within the housing and comprises the first heat exchange device in heat exchange relationship with the housing, operable to transfer heat from the means for combusting to heat the secondary gas and to conduct at least a portion of the heated secondary gas as the working fluid to the work-producing device for expansion therein, to minimize heat losses from the system and allow the system to operates at least substantially adiabatically.

24. The system of claim 23 further comprising:
means for introducing water into the means for combusting to cool a flame therein;
means for recovering at least a portion of gases exhausted from the work-producing device as the secondary gas, the secondary gas cooling by expansion through the recovery to condense at least part of the water in the secondary gas; and
means for feeding the secondary gas to the thermally insulated mixing device, the condensed water being substantially removed from the secondary gas as the secondary gas is fed to the mixing device.

25. The apparatus of claim 23, including means for computer monitoring and control comprising; a. means for operating safety and overpressure valves; b. means for regulating pressures and temperatures; c. means for observing flame during operation; d. means for proportioning and diverting flows of gas streams; and e. means for switching entry and exit ports in said reactor and devices associated with operation of the system.

26. The system of claim 23 wherein the thermally insulated mixing device comprises:
a venturi-type nozzle for mixing the higher pressure combustion products with the lower pressure secondary gas:
means for tangential entry of the gaseous combustion products at the predetermined first range of temperature and pressure in a perimeter of the venturi-type nozzle; and
a hollow cylindrical heat-resistant chamber having a secondary air inlet, sealed ends and at least one of interior and exterior insulations.

27. The system of claim 23 wherein:
the work-producing device is in at least one of a heated space and a cooled space; and
the means for conducting the working fluid to the work-producing device is operable to feed a portion of the admixture to the at least one the heated space and the cooled space to alter a temperature of the space.

28. The system of claim 23 wherein the secondary gas is at least one of ambient air, pressurized air, preheated ambient air and preheated pressurized air.

29. The system of claim 23 further comprising means for recovering at least a portion of the expanded gases and feeding the recovered portion as the secondary gas to the thermally insulated mixing device.

30. The system of claim 23 wherein the work producing device comprises one or more rotary gas motors arranged in at least one of series and parallel suitable to load conditions the gas motors being configured to operate by the admixture of gases at the third predetermined range of temperature and pressure.

31. The system of claim 30 wherein:
the rotary gas motors comprise one or more turbines each having an output shaft, and means for regulating and automating controls of the turbines such that the output shaft torque is suitably matched to self-propelled vehicles operating load characteristics; and
the turbines are mechanically coupled in at least one of series and parallel to loads to perform as torque converters.

32. The system of claim 30 further comprising:
a self-propelled vehicle powered by the rotary gas motors;
means for providing the admixture of combustion products and the lower pressure secondary gas to the rotary gas motors during acceleration of the vehicle;
means for providing ambient air to the rotary gas motor during deceleration of the vehicle; and
means for storing pressurized ambient air exhausted from the rotary gas motors and for supplying the exhausted pressurized air to the rotary gas motors for subsequent accelerations of the vehicle.

33. The system of claim 31 wherein the rotary gas motors comprise:
a double acting free piston axially reciprocating in a chamber having a bore, a first end, and a second end;
shaft extensions for coupling loads; and
means for injecting and venting the secondary gas with automatic controls for rapid oscillation.

34. The apparatus of claim 23, wherein said housing has a lining of refractory high temperature insulation.

35. A method for producing power from combustion of a fuel comprising:
feeding a pressurized oxygen-containing gas and a combustible fuel to at least one combustion zone to form a combustible mixture therein;
combusting the combustible mixture in the combustion zone under substantially adiabatic conditions to form gaseous combustion products;
exhausting the gaseous combustion products from the combustion zone at a first predetermined range of elevated temperature and pressure;
forming in a mixing zone an admixture of the exhausted combustion gases and a secondary gas at a second predetermined range of temperature and pressure lower than the first predetermined range; and
feeding the admixture as working fluid to a work producing zone for expansion of the working fluid to produce work thereby.

36. The method of claim 35 wherein there is a single said combustion zone.

37. The method of claim 35 wherein the secondary gas is at least one of ambient air, pressurized air, preheated ambient air and preheated pressurized air.

38. The method of claim 35 further comprising providing the secondary gas by recovering at least a portion of the expanded gases and recycling the portion to the mixing zone.

39. The method of claim 35 further comprising:
propagating a flame in the combustion zone; and
introducing water into the combustion zone to cool the flame, reduce formation of oxides of nitrogen and increase a weight of the gaseous combustion products.

40. The method of claim 35 wherein feeding the admixture as the working fluid to the work producing zone to produce work results in production of exhaust gases including pollutants, which comprise at least one of species of carbon dioxide and oxides of nitrogen, and wherein the method further comprises reacting the exhaust gases with a pollutants absorbing chemical to reduce an amount of the pollutants in the exhaust gases.

41. An adiabatic power generating system, comprising:
means for elevating a temperature and pressure of a primary gas in a housing to form gaseous products at a predetermined first range of elevated temperature and pressure, the housing being thermally insulated to minimize heat losses from the system and allow the system to operate at least substantially adiabatically;
means for conducting the gaseous products downstream to a thermally insulated mixing device;
means for introducing into the thermally insulated mixing device a secondary gas at a second range of temperature and pressure lower than the first range to form in the thermally insulated mixing device an admixture of gases as a working fluid at a third range of temperature and pressure intermediate the first and second ranges; and
means for conducting the working fluid to a work-producing device operable to produce work by expansion of the working fluid.

42. The system of claim 41, wherein the means for elevating the temperature and pressure of the primary gas comprises at least one of a temperature altering device and a gas compressing device, the at least one of the temperature altering device and the gas compressing device being operable to elevate the temperature and pressure of the primary gas to the predetermined first range of elevated temperature and pressure.

43. The system of claim 42 wherein the gas compressing device comprises at least one of a wind turbine, a turbine and means for routing the working fluid to the turbine to power the turbine, and an electric motor.

44. The system of claim 41 wherein the means for elevating the temperature and pressure of the primary gas, the thermally insulated mixing device and the work producing device are downsized and adapted to provide power to and alter a temperature of at least one of mechanical components and electronic components in small scale applications including miniaturized applications.

* * * * *